United States Patent
Zhang et al.

(10) Patent No.: US 6,999,432 B2
(45) Date of Patent: Feb. 14, 2006

(54) CHANNEL AND QUALITY OF SERVICE ADAPTATION FOR MULTIMEDIA OVER WIRELESS NETWORKS

(75) Inventors: Qian Zhang, Hubei (CN); Wenwu Zhu, Basking Ridge, NJ (US); Ya-Qin Zhang, West Windsor, NJ (US); Guijin Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1015 days.

(21) Appl. No.: 09/895,870

(22) Filed: Jun. 28, 2001

(65) Prior Publication Data

US 2002/0054578 A1 May 9, 2002

Related U.S. Application Data

(60) Provisional application No. 60/218,375, filed on Jul. 13, 2000.

(51) Int. Cl.
*H04Q 7/00* (2006.01)

(52) U.S. Cl. .................. 370/328; 455/460; 455/524; 455/525; 455/422.1

(58) Field of Classification Search ............... 370/328, 370/389, 441, 442, 347, 428, 411, 412–419, 370/445, 444, 447, 461, 462, 450, 455, 480, 370/341, 342, 229, 522, 230–235, 395.1, 370/524, 330, 332, 333, 336, 337, 345, 236, 370/237, 252, 242, 394, 310, 469, 280, 281, 370/294, 295, 329, 349; 455/422.1–460, 455/524–525, 464; 714/748, 749; 340/825.01, 340/825.5, 825.51, 825.03

See application file for complete search history.

(56) References Cited

U.S. PATENT DOCUMENTS

| | | | | |
|---|---|---|---|---|
| 6,115,390 A | * | 9/2000 | Chuah | 370/443 |
| 6,208,620 B1 | * | 3/2001 | Sen et al. | 370/231 |
| 6,285,665 B1 | * | 9/2001 | Chuah | 370/319 |
| 6,377,548 B1 | * | 4/2002 | Chuah | 370/233 |
| 6,567,416 B1 | * | 5/2003 | Chuah | 370/418 |
| 6,654,344 B1 | * | 11/2003 | Toporek et al. | 370/230 |
| 6,714,987 B1 | * | 3/2004 | Amin et al. | 709/249 |

* cited by examiner

*Primary Examiner*—Wellington Chin
*Assistant Examiner*—Jamal A. Fox
(74) *Attorney, Agent, or Firm*—Lee & Hayes, PLLC

(57) ABSTRACT

A cross-layer architecture is provided for delivering multiple media streams over 3G W-CDMA channels in adaptive multimedia wireless networks. A resource management mechanism dynamically allocates resources among different media streams adapted to channel status and Quality of Service (QoS) requirements. By taking the time-varying wireless transmission characteristics into account, an allocation of resources is performed based on a minimum-distortion or minimum-power criterion. Estimates of the time-varying wireless transmission conditions are made through measurements of throughput and error rate. Power and distortion minimized bit allocation schemes are used with the estimated wireless transmission conditions to for dynamically adaptations in transmissions.

32 Claims, 17 Drawing Sheets

1: received state
0: loss state

Control Plane Protocol Stack

User Plane Protocol Stack

CHANNEL AND QUALITY OF SERVICE ADAPTATION FOR MULTIMEDIA OVER WIRELESS NETWORKS

CROSS-REFERENCE TO RELATED APPLICATIONS

This non-provisional application claims priority to U.S. Provisional Patent Application Ser. No. 60/218,375, filed on Jul. 13, 2000, which is incorporated herein by reference.

TECHNICAL FIELD

The present invention relates to transmission of data over a network, and is more particularly related to systems, methods, and program products for transmission of multimedia data to a wireless host through a network.

BACKGROUND

The first generation (1G) of mobile cellular communications systems were analog such as Advanced Mobile Phone Service (AMPS), Total Access Communications System (TACS), and Nordic Mobile Telephone (NMT). Primarily used for voice, they were introduced in the late 1970s and early 1980s. Starting in the 1990s, second generation (2G) systems such as GSM (Global System for Mobile Communications), TDMA (Time Division Multiple Access), and CDMA (Code Division Multiple Access) used digital encoding. Current 2G mobile communication systems are mainly geared for speech traffic and operate in symmetric full-duplex fashion. Data rates and other quality of service parameters in these systems are the same in the uplink and downlink. Real-time media can seldom be served in a 2G wireless platform.

The third generation (3G) system is defined by the International Telecommunications Union (ITU) under the IMT-2000 global framework and is designed for high-speed multimedia data and voice. Its goals include high-quality audio and video transmission and advanced global roaming, which means being able to go anywhere and automatically be handed off to whatever wireless system is available (in-house phone system, cellular, satellite, etc.). In third generation systems, data traffic, as generated by IP-based information retrieval applications, is expected to dominate. Different kinds of applications can be served by 3G systems at a certain time instance.

The characteristics of different kinds of media vary dramatically. For real time media transmission, such as video and audio, low delay is required while some kinds of errors can be tolerable. On the other hand, for non-real time media transmission, such as web access and file download, reliability is required while some levels of latency can be tolerable. Based on the different characteristics of different media streams, there are various QoS (Quality of Service) levels that are required. A key problem in a system with several services and different QoS level requirements is the derivation of a combination of these quality criteria into a single performance measure or cost function, where the combination will allow a straightforward mathematical optimization formulation.

It would be an advance in the art to provide a technique for optimizing a system with several services having different QoS level requirements for multimedia delivery over a wireless network, such as a third generation Wideband-CDMA network.

SUMMARY

A system, method, and program product provide a cross-layer multiple media streams delivery architecture for end-to-end optimization of quality in the support of different classes of QoS (Quality of Service) levels and provide a resource allocation scheme to allocate resources that are adapted to Wideband-CDMA (W-CDMA) channel platforms.

BRIEF DESCRIPTION OF THE DRAWINGS

Generally, the same numbers are used throughout the drawings to reference like elements and features.

FIG. 9a shows a control-plane protocol stack for a 3G network used for 3G-specific control signaling, and where FIG. 9b shows a user-plane protocol stack for all information sent and received by a user and transported via the user plane with the user-plane protocol stack.

FIG. 14a is a graph indicating the relation of distortion vs. MIPS and FIG. 14b is a graph indicating the relation of MIPS vs. power consumption.

FIG. 18a is a graph of distortion vs. source rate and FIG. 18b is a graph of delay vs. source rate.

FIG. 25a is a graph illustrating computation time in ms vs. frames and FIG. 25b is a graph illustrating PSNR vs. frames.

DETAILED DESCRIPTION

A cross-layer media delivery architecture that supports different classes of QoS (Quality of Service) levels and a resource allocation scheme to allocate available resources, adapted to W-CDMA channel status, are provided and through which end-to-end optimal quality are achieved.

The architecture is useful for designing adaptive multimedia wireless networks, particularly for the Wideband-CDMA (W-CDMA) platform, which is a Third Generation (3G) technology that increases data transmission rates in the Global System for Mobile Communications (GSM) by using CDMA (Code Division Multiple Access) instead of Time Division Multiple Access (TDMA).

Four areas, as follows, are discussed for an implementation of a network design:

(a) Theory and methodologies that facilitate a cross-layer design of a channel and QoS level adaptive scheme for multimedia delivery over W-CDMA. Several different layers are addressed for an implementation, including the air interface or Physical Layer, the Medium Access Control (MAC) layer, the Radio Link Control Layer (RLC), the Network Layer, the Transport Layer, and the Application Layer. Each layer, as discussed below, is designed to be adaptable to various conditions.

(b) Accurate channel modeling that predicts or estimates network behavior.

(c) Different classes of QoS levels are supported in the delivery of multiple media streams.

(d) Dynamic resource management for multiple services in the cross-layer media delivery architecture that adaptively adjusts the behavior of each layer.

1. W-CDMA Providing the Probability for Multi-Services Delivery

In an implementation of the Third Generation (3G) platform, simultaneous supporting for several services is provided in a single radio interface for a certain terminal. An example of this is generally illustrated in FIG. 1a.

Figure 1A:
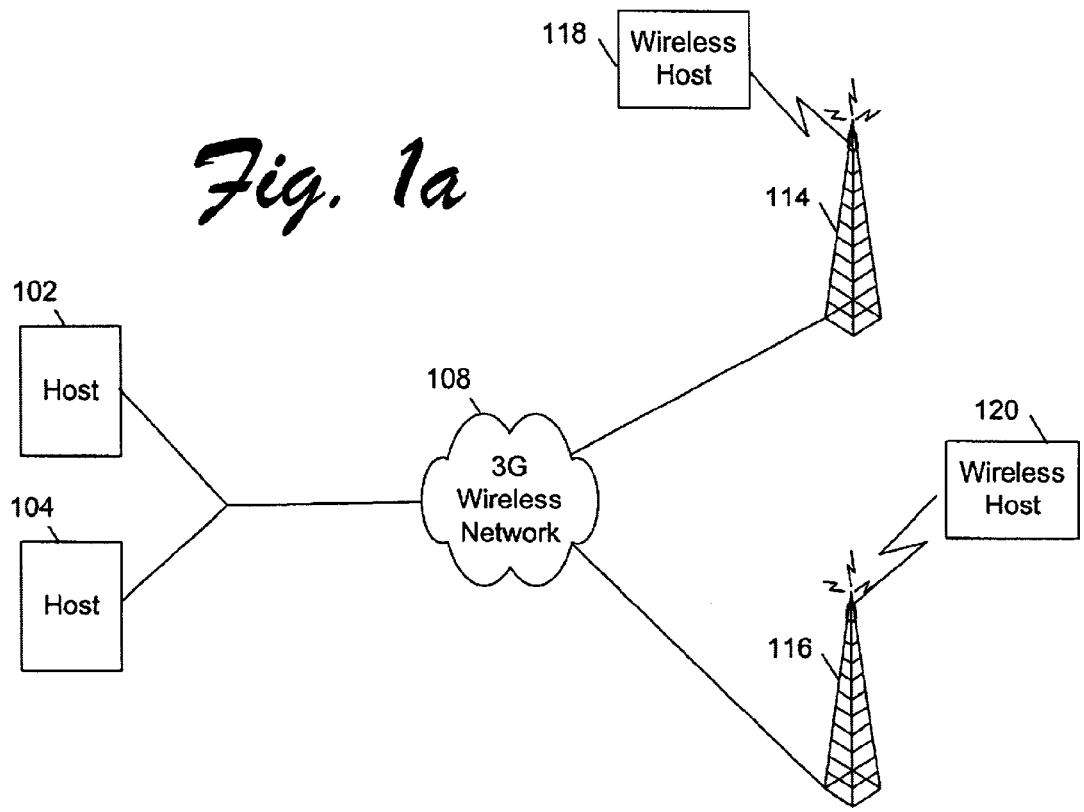
FIGS. 1a and 1b are block diagrams showing an end-to-end architecture for data transmission, including video data, over a 3G network, according to one aspect of the present invention.

Turning to FIG. 1a, a block diagram of an example of a 3G wireless network is presented within which the teachings of the present invention may be practiced, according to one example implementation. More specifically, FIG. 1a illustrates a block diagram wherein one or more hosts 102, 104 (e.g., content servers) are coupled to provide data to one or more wireless hosts 118, 120 through a 3G wireless network 108 via wireless network components 114 and 116.

As used herein, hosts 102, 104 are each intended to represent any of a wide variety of computing devices which provide content to requesting users. According to one implementation, one or more of host 102, 104 is a content server, to stream media content to requesting users upon request. In this regard, hosts 102, 104 may well comprise a personal computing system, a server computing system, a media server farm, a KIOSK, thin client hosts, thick client hosts, and the like. According to one implementation, to be described more fully below, host 102, 104 invokes an instance of a content delivery application upon receiving a request for content from a requesting user. The host 102, 104 implements the channel and QoS adaptation for multimedia delivery in 3G wireless network 108, at least in part on feedback received from wireless host 118, 120. The cross-layer media delivery architecture implemented by hosts 102, 104 support different classes of QoS (Quality of Service) levels and a resource allocation scheme to allocate resources, adapted to W-CDMA channel status, at least in part, on information received from the wireless host 118, 120.

Wireless hosts 118, 120 are also intended to represent any of a wide variety of computing devices with wireless communication facilities. In this regard, wireless hosts 118, 120 may well comprise cellular telephones, digital wireless telephones, personal digital assistant (PDA) with wireless communication facilities, a personal computing system with wireless communication facilities, and the like. As will be developed more fully below, wireless host 118, 120 invokes an instance of an application to request and receive content from a host 102, 104. According to one aspect of the invention, wireless host 118, 120 identifies transmission problems (e.g., multipath, fading, high BER problems, etc.) in the wireless communication channel (e.g., 114, 116), and informs hosts 102, 104 of such wireless transmission problems via the schemes described herein.

The wireless 108 network is intended to represent a wide variety of such networks known in the art. In this regard, the wireless network 108 may well be comprised of a cellular telephony network, a third generation digital communication system network, a personal communication system (PCS) network, a digital cellular telephony network, a two-way paging network, a two-way radio network, a one-way broadcast radio network, a wireless local area network (WLAN) and the like. Similarly, the wireless communication channel between 114/116 and 118/120 is intended to represent any of a wide variety of wireless communication links such as, for example, a radio frequency (RF) communication link, an infrared (IR) communication link, and the like commonly associated with any of the wireless communication networks above.

Figure 1B:
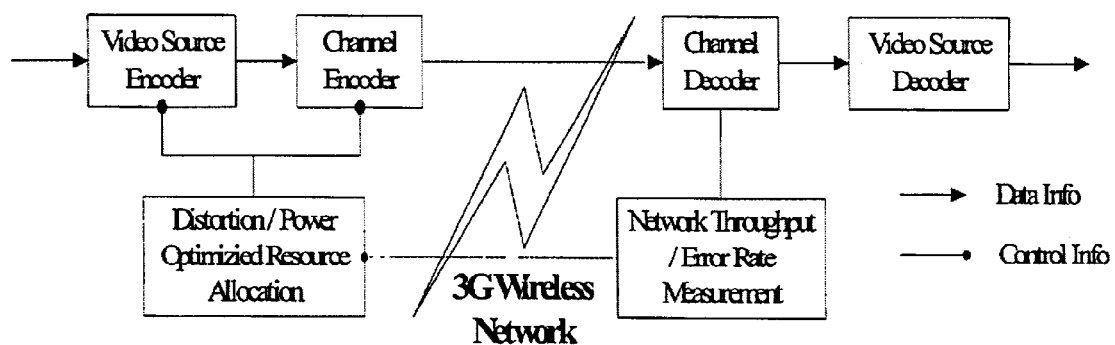

FIG. 1b is a block diagram of an example of a server in communication with a wireless client through a 3G wireless network. The server implements a distortion/power optimized resource allocation scheme in accordance with an implementation of the invention, described in Section 5 below, in the allocation of the available resources. The wireless client communicates network throughput and error rate measurements back to the server. The server uses the network throughput and error rate measurements from the wireless client in its distortion/power optimized resource allocation scheme.

Figure 1C:
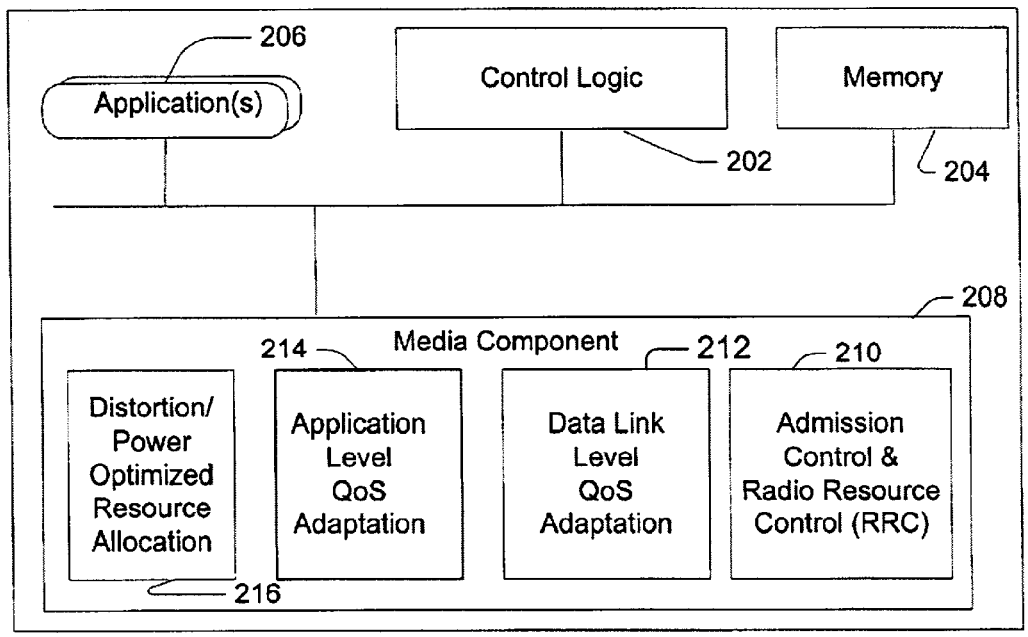
FIG. 1c is a block diagram of an example content server suitable for use in the data network, according to one aspect of the present invention.

FIG. 1c is a block diagram of an example content server 200 suitable for use in the data network as, for example, host 102, 104, according to one example embodiment. In accordance with the illustrated example implementation of FIG. 1c, server 200 is generally comprised of control logic 202, a system memory 204, one or more applications 206, and a media component 208. As used herein, server 200 is communicatively coupled to a wireless network (e.g., 108) to provide a requesting user with media content. According to one implementation, an application 206 (e.g., streaming application) is selectively invoked to retrieve media content from some source (e.g., file, audio/video device, audio/video tape, etc.) into a local memory 204 for encoding and transmission to a requesting user via media component 208. In this regard, server 200 is intended to represent any of a wide variety of servers for streaming media content.

Control logic 202 selectively invokes and controls various functional elements of content server 200 in response to requests for content. According to one embodiment, control logic 202 receives a request for media content from a remote host (e.g., wireless host 118), and selectively invokes an instance of a content delivery application 206 (e.g., a media streaming application) along with the resources of media component 208 to satisfy the request for content. According to one implementation, media component 208 is one of a plurality of applications 206 available on content server 200.

As used herein, control logic 202 and system memory 204 are intended to represent any of a wide variety of such devices known in the art. In this regard, control logic 202 may well include one or more of a processor, a microcontroller, an application specific integrated circuit (ASIC), a programmable logic device (PLD), a programmable array logic (PAL), and/or instructions which, when executed by one of the foregoing devices, implements such control logic. Similarly, memory 204 is intended to represent any of a wide variety of volatile and/or non-volatile memory such as, for example, random access memory, read-only memory, a hard disk, an optical disk, a magnetic tape, and the like.

As introduced above, media component 208 is selectively invoked by control logic 202 in response to a request for content from server 200. As shown, media component 208 is comprised of an Admission Control and Radio Resource Control (RRC) module 210, a Link Level Quality of Service (QoS) Adaptation module 212, an Application Level Quality of Service (QoS) Adaptation module 214, and a Distortion/Power Optimized Resource Allocation Module 216. Each of the modules 210–216 will be described below in conjunction with the descriptions of FIGS. 3–5b.

Figure 1D:
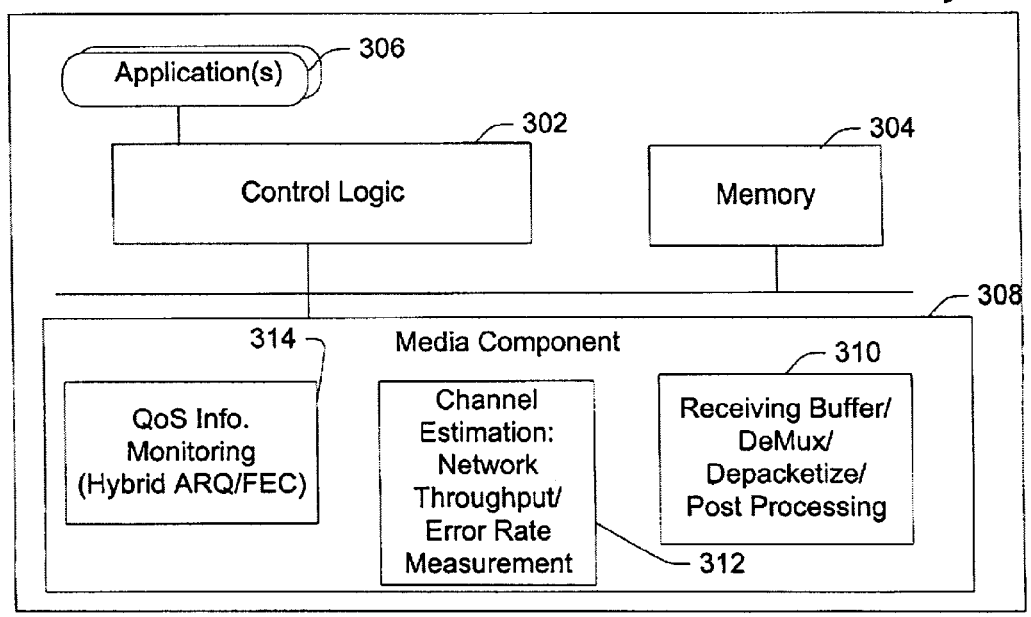
FIG. 1d is a block diagram of an example wireless host suitable for use in the data network, according to one aspect of the present invention.

FIG. 1d is a block diagram of an example wireless host 300 suitable for use in the data network, according to one aspect of the present invention. As used herein, wireless host 300 may well be used in a wireless network 108 as wireless host 118, 120. As introduced above, wireless host 300 is intended to represent a wide range of computing systems with wireless communication capability such as, for example, wireless telephony devices, PDA's with wireless communication capability, one- and/or two-way pagers, personal computing systems, and the like.

In accordance with the illustrated example embodiment of FIG. 1d, wireless host 300 is generally comprised of control logic 302, memory 304, application(s) 306 and a media component 308, each coupled as shown. As above, each of control logic 302 and memory 304 are intended to represent such logic and memory as are typically found on such devices, and need not be described further. According to one example implementation, applications 306 include an application for receiving and rendering content from a communicatively coupled server (e.g., 102, 104). According to one example, applications 306 include an Internet browser application that enables a wireless host to access and receive content (e.g., media content) from an Internet server (e.g., 102, 104).

When an application is invoked to access and receive content from a server (102, 104), control logic 302 invokes an instance of media component 308 to provide the requisite interface at the Transport Layer. In accordance with the illustrated example implementation of FIG. 1d, media component 308 includes a Receiving Buffer/DeMultiplexer (DeMux)/Depacketizer/Post Processing module 310, a Channel Estimation: Network Throughput/Error Rate Measurement module 312, and a Quality of Service (QoS) Information Monitoring module 314. Each of the modules 310–314 will be described below in conjunction with the descriptions of FIGS. 5a and 5b.

Consider a scenario where a customer has a simultaneous voice or video call with Web browsing on the customer's wireless device. This is essentially an added value for the end-user. To support multiple services at a certain time instance, a third generation wireless platform adopts the architecture illustrated in FIG. 2. One of the central building blocks of the 3G W-CDMA platforms is the multi-rate support provided by the Physical Layer. The Physical Layer is able to execute a change of data rate at multiple of the maximum frequency of 10 ms in a radio frame. Thus, the natural task of medium access control (MAC) is to select the combination to be applied based on offered load from a set of logical-channel inputs. The Radio Link Control (RLC) sublayer of the Data Link Layer provides segmentation and retransmission services for both user and control data. The Radio Resource Control (RRC) sublayer of the Network Layer handles all with peer-to-peer control signaling between the network and the terminal, and by acting as a management entity and configuring the operation of all lower layers.

The functions defined for RLC are specific to one logical channel, which is why the behavior of RLC is described through one entity as connected to one logical channel. The functions of MAC address either one common channel or one terminal including the operation on dedicated channels. Therefore, no functional entities specific to one stream of data are shown on MAC.

2. Cross-Layer Architecture for Channel and QoS Level Adaptive Multimedia Delivery Over W-CDMA Different broadband services require different amounts of bandwidth and have different priorities. For example, a connection for visual communications will in general require more bandwidth than one for data communications, and a voice connection will in general be of higher priority than either a data or a video connection. In response to these varied demands, the network designer may choose to assign different amounts of bandwidth to different types of traffic. The motivation for such an approach stems from the desire to support different kinds of multimedia services with a reasonable level of performance and without letting the demand from any one-type shutout other types of services. The challenge for the designer is to come up with techniques that are able to balance the needs of the various applications with the need of the system to accommodate as many connections as possible. This task of providing a guaranteed quality of service (QoS) level with high bandwidth utilization while servicing the largest possible number of connections can be achieved through a combination of intelligent admission control, bandwidth reservation and statistical multiplexing.

To effectively deliver multiple services over 3G W-CDMA channels, multiple stream support and QoS level differentiation should be addressed in the architecture. Multiple Stream Support is defined as the ability to simultaneously support streams with different QoS level requirements. This is important since multimedia communications between users may have components such as voice, video, and data with different QoS level requirements. QoS Level Differentiation is defined as the ability to provide various data rates and various Bit Error Rates (BERs) to higher Network Layers. This is desirable to support the QoS levels of higher network layers.

The third generation (3G) wireless standards define concepts that can support ranges of parameters values. This results in many alternative ways to map a set of traffic and QoS level parameters of the upper Application Layer to the lower layers for radio transmission. In the delivery architecture of one implementation, the QoS level adaptation is divided into two parts: A Data Link Level QoS Adaptation and an Application Level QoS Adaptation, each of which is discussed below.

2.1 Data Link Level QoS Adaptation

Figure 2:
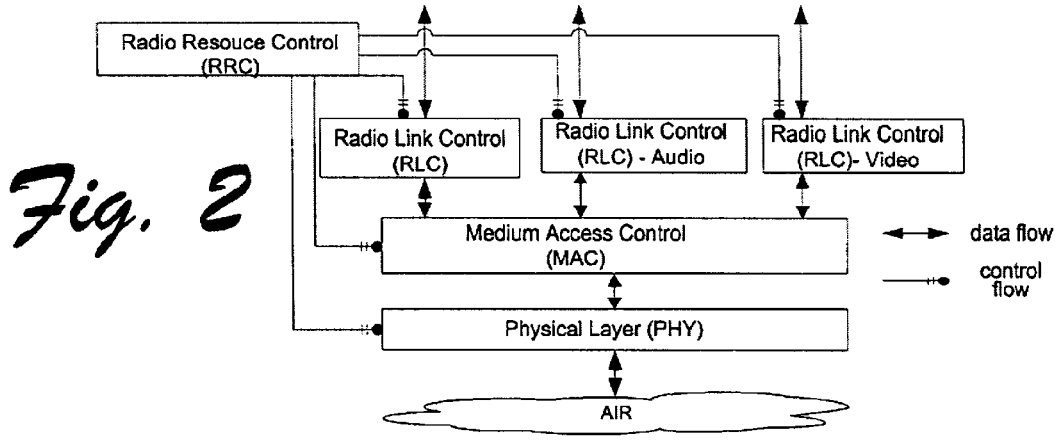
FIG. 2 depicts a delivery architecture used to support different classes of Quality-of-Service (QoS) levels for multiple services at a certain time instance in a third generation (3G) wireless platform for the delivery of multiple kinds of media over wireless channels.

To effectively deliver multiple kinds of media over 3G W-CDMA channels, different classes of QoS levels need to be supported in the delivery architecture. The quality of the transmitted stream is mainly related to its sending rate, latency, fault tolerance, level of protection, transmitted channel characteristics, etc. "Level of protection" is mentioned here because various data types differ in robustness and in the perceptual effects of errors. In the delivery architecture seen in FIG. 3, an Admission Control and RRC module conducts a negotiation at the Radio Resource Control (RRC) Layer with the RLC and MAC sublayers of the Data Link Layer, and also with the Physical layer, as seen in FIG. 2, to determine an appropriate QoS level supporting.

Figure 3:
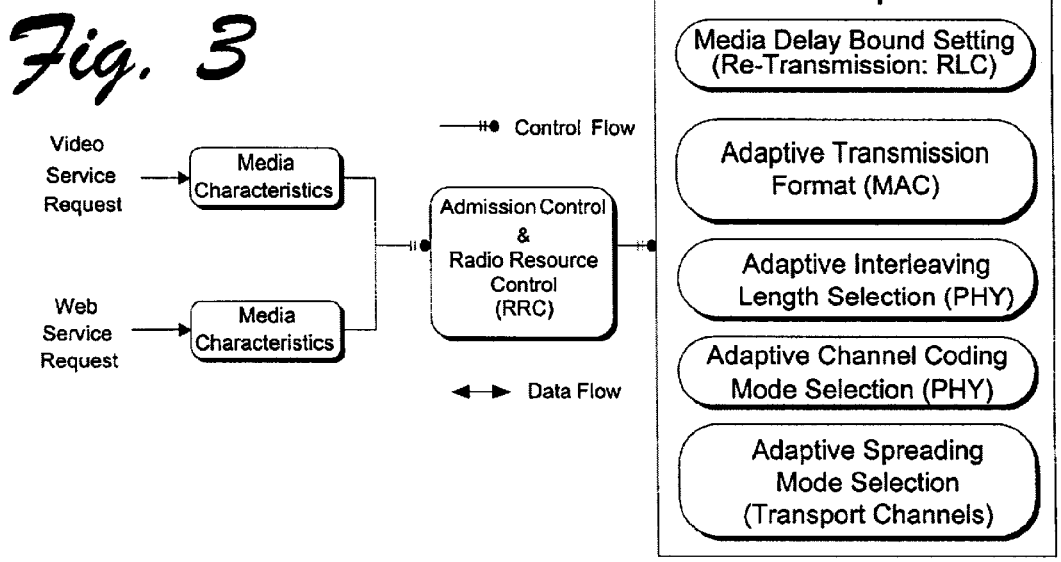
FIG. 3 depicts a Data Link Level Quality of Service Adaptation data and control flow chart, where an admission control module negotiates with the Radio Link Control (RLC) and Medium Access Control (MAC) sublayers of the Data Link Layer, as well as the Physical Layer (PHY) to determine an appropriate mode for delivery of multiple kinds of media over wireless channels using the architecture depicted in FIG. 2.

FIG. 3 shows an Admission Control & Radio Resource Control (RRC) module that corresponds to the Admission Control and Radio Resource Control (RRC) module 210 seen in FIG. 1c. FIG. 3 also shows a Data Link Level QoS Adaptation module that corresponds to the Data Link Level Quality of Service (QoS) Adaptation module 212 seen in FIG. 1c.

To support simultaneous multiple services delivery over a W-CDMA channel, each service is mapped into an individual transport channel. For an incoming service request, corresponding configuration needs are processed based on the characteristics of the service request. Latency, fault tolerance and level of protection requirements are passed from the source to the channel coding side. Then, a suitable interleaving length at the Physical Layer and a suitable retransmission count at the Radio Link Control (RLC) layer can be calculated based on the above requirements. Accordingly, as part of the module for the Data Link Level QoS adaptation, FIG. 3 depicts the Adaptive Interleaving Length Selection module for the Physical Layer (PHY), and also depicts the Media Delay Bound Setting module for the Radio Link Control (RLC) layer.

A suitable channel encoding model as to a protection rate is selected based on the fault tolerance requirement in the Physical Layer. As an example, a ½ convolutional code is selected for the video delivery and a turbo code is selected for the Web data application. The source encoder also controls the required level of protection, which in turn will affect the queue scheduling scheme in the MAC sublayer of the Data Link Layer as well as the error protection degree in the Application Layer.

By selecting the proper bit rates, transmitter powers, and the transmission schedule in each logical link, the aim is to maximize the total throughput defined as the sum of all (average) data rates in all the links that are currently active.

2.2 Application Level QoS Adaptation

As the previous Section 2.1 mentioned, the Data Link Level QoS Adaptation takes effect when new service request comes in. The Application Level QoS adaptation takes effect while media is being delivered.

Figure 4:
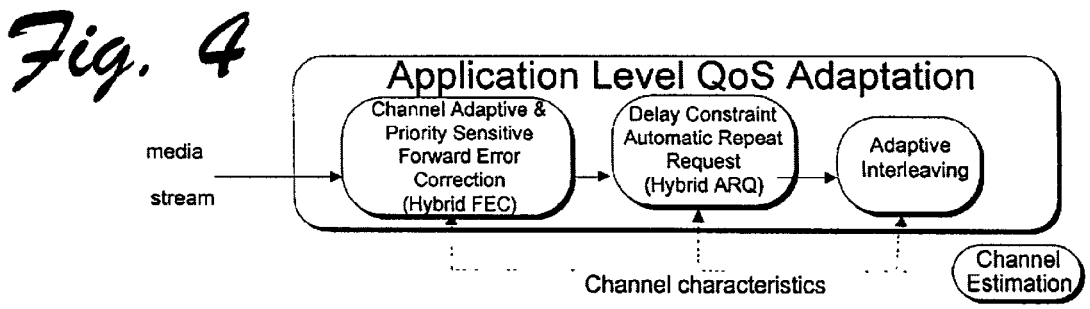
FIG. 4 depicts an Application Level Quality of Service (QoS) adaptation data and control flow chart, which includes channel adaptive error control and interleaving mechanisms.

Considering the limited bandwidth and varying error rate of the wireless link, it is important that the error control mechanism is efficient. To this end, the aim is to investigate the use of a channel adaptive hybrid error control mechanism as illustrated in FIG. 4, where the amount of redundancy is kept to a minimum. FIG. 4 shows an Application Level QoS Adaptation module that corresponds to the Application Level QoS Adaptation module 214 in media component 208 of server 200 seen in FIG. 1c.

There are two basic error correction mechanisms, namely Automatic Repeat reQuest (ARQ) and Forward Error Correction (FEC). ARQ requires the receiver to make requests for the retransmission of the lost/corrupted packets. The receiver can request such a retransmission explicitly by means of a negative acknowledgement (NACK). The receiver can also request a retransmission implicitly by using acknowledgements (ACK) and timeouts. On the other hand, FEC transmits original data together with some redundant data as protection, called parities, to allow reconstruction of lost/corrupted packets at the receiver. Of these two error control mechanisms, FEC has been commonly suggested for real-time applications due to the strict delay requirements and semi-reliable nature of media streams.

However, FEC incurs constant transmission overhead even when the channel is loss free. There are several variations of ARQ protocols, which are stop-and-wait, go-back-N, and selective-repeat, respectively.

Notice that the FEC, or error control scheme, can be adapted to the instantaneous error rate, while ARQ is used to recover lost/corrupted packets which cannot be recovered through FEC. Here there is a new kind of ARQ, which named delay-bounded ARQ. This is a limited retransmission ARQ protocol, i.e., if a packet does not arrive after certain time interval, it gives up and passes the loss to higher layers, as seen in the Delay Constraint Automatic Repeat Request (Hybrid ARQ) module of FIG. 4.

In order to keep the FEC to minimum, the developed error control mechanism also takes the media coding characteristics into account. The amount of redundancy is selected by distinguishing the significance of the various media types and by determining the impact of error rate from each of the media types onto the overall media quality, as seen in the Channel Adaptive & Priority-sensitive Forward Error Control (Hybrid FEC) module of FIG. 4.

The simulation results discussed in Section 9 show that this channel adaptive hybrid error control scheme with priority-sensitive redundancy provides better performance than other error control schemes.

3. Channel and QoS Level Adaptive Multimedia Delivery Architecture

In summary, three typical characteristics are embodied in this delivery architecture:

(i) Dynamically generate the feedback about the Bit Error Rate (BER)/Forward Error Correction (FEC) protection level and delay. At the same time, accurately estimate the channel status.

(ii) Periodically re-allocate the available resources to different kinds of media streams based on their media characteristics and the estimated channel status.

(iii) Adaptively adjust the QoS level.

A major challenge in multimedia transmission over a W-CDMA channel is the joint consideration of the Network Layer control and the Application Layer control to achieve optimum end-to-end performance. To achieve the last mentioned sub-goal, cross-layer adaptation mechanisms have been designed in this framework, which are discussed in detail below, and are in-part summarized as follows:

(a) adaptively spreading in the air interface to support various data rates for different media types;

(b) adaptively selecting an encoding bit rate model and an interleaving length in the Physical Layer to satisfy the different latency and fault tolerance requirements of the different media types;

(c) adaptively scheduling packets between multiple media streams in the Medium Access Control (MAC) sublayer of the Data Link Layer;

(d) adaptively determining the retransmission times in the Radio Link Control (RLC) Layer based on the media latency characteristics of the media stream;

(e) adaptively selecting a transport protocol for different media streams. Different media streams may adopt different kinds of transport protocol at the Transport Layer;

(f) adaptively selecting TCP protocol for the delivery of Web data and file data, and adaptively selecting a proposed UDP-like protocol for the delivery of other data, such as real time data including video and audio;

(g) adaptively allocating bits from the source encoder for a source bit stream and for Forward Error Correction (FEC) coding in the Application Layer based on the varying channel characteristics.

Figure 5A:
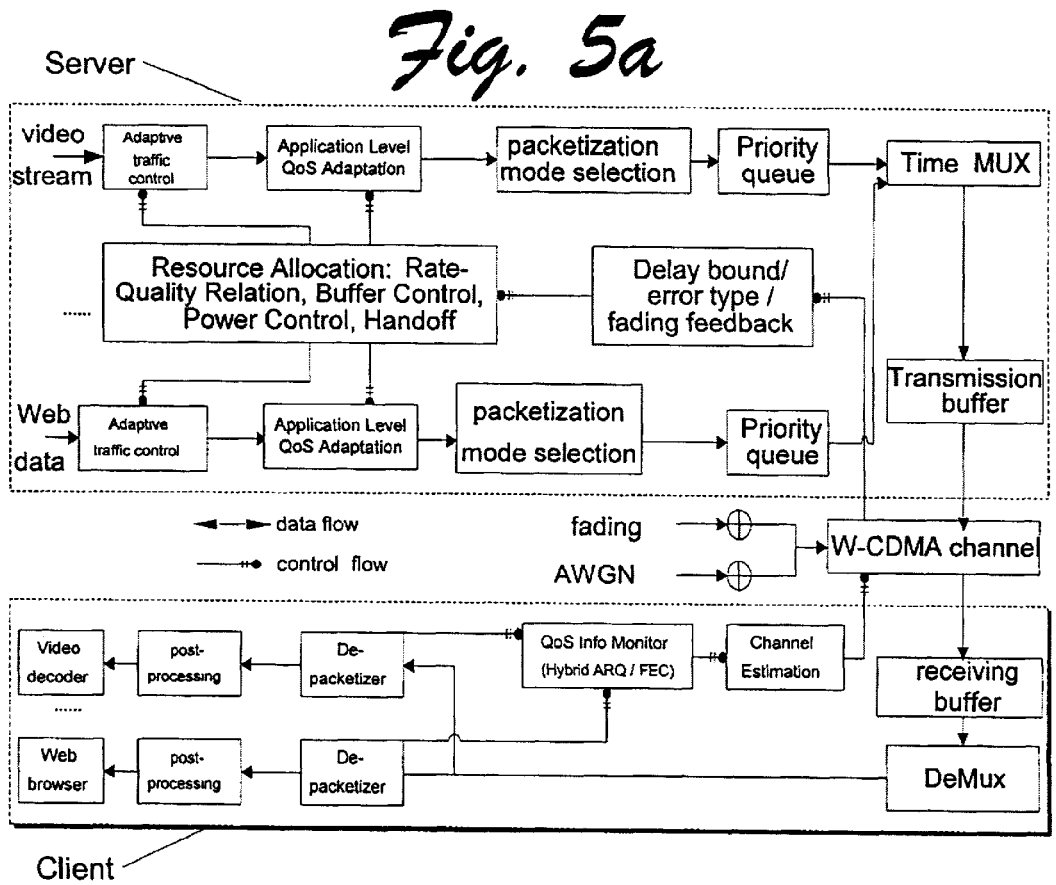
FIG. 5a is a flow diagram showing a detail view of the framework for multimedia delivery for multiple services transmission over a Wideband-CDMA channel between a mobile station and a base station.

Giving a detailed view of the functionality of a multiple service transmission over a W-CDMA channel, mainly between a mobile station and a base station, FIG. 5a depicts a framework of one implementation for multimedia delivery. Parts of the multimedia delivery framework will be described more detail in the following several Sections.

4. Accurate Channel Modeling, Estimation and Dynamic Feedback Generation

To accurately estimate channel status for use in an error control scheme, a server in the network can monitor several channel-related characteristics on a near real-time basis on the fly. In the cross-layer architecture of one implementation, various layers are in charge of different kinds of feedback. Channel bit error rate (BER), frame error rate (FER), and the fading depth are fed back by the Physical Layer. Error type and transmission delay are fed back by the Data Link Layer. Location and handoff notification are fed back by the Network Layer. Besides this feedback information, a model can be adopted to accurately estimate the channel status.

Aiming at simulating wireless channels characterized by slow, highly-correlated-fading, a moderately slow motion of the mobile station is contemplated.

Figure 6:
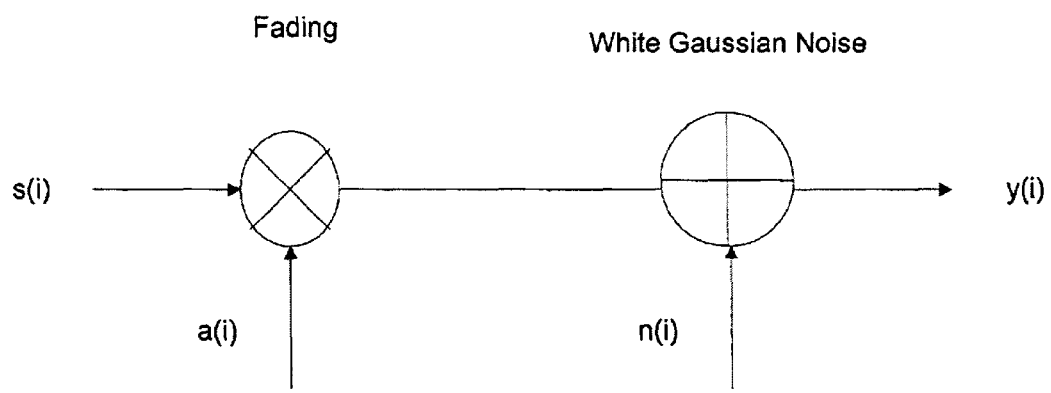
FIG. 6 depicts a fading channel model, where a transmitted signal is subjected to a Rayleigh-distributed amplitude factor to account for the effects of fading, and to which Gaussian white noise is added.
Figure 7:
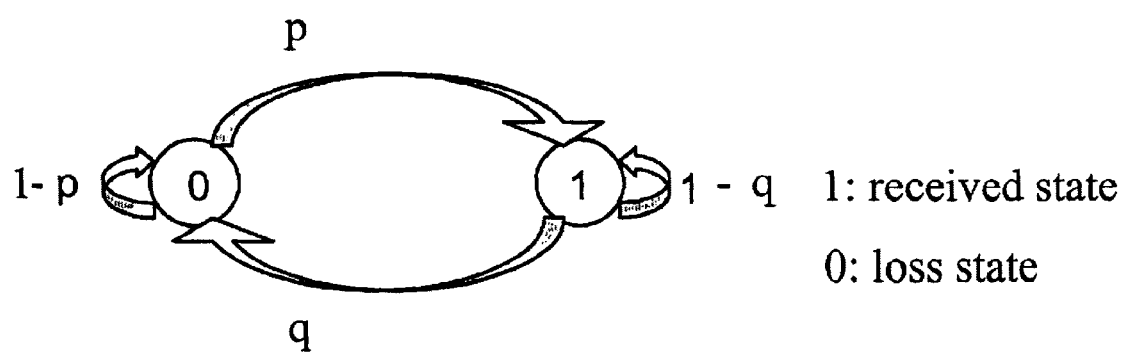
FIG. 7 depicts a two-state Markov chain, which models the fading channel seen in FIG. 6 considering the dependence between consecutive packet-losses, where "1" is the received state and "0" is the loss state.

A channel model for one implementation is briefly depicted in FIGS. 6 and 7. As depicted in FIG. 6, a transmitted signal s(i) is first multiplied by a Rayleigh-distributed amplitude factor a(i) taking into account the effect of fading, and then an Average Gaussian white noise (AWGN) factor n(i) is added to the signal. The sequence of Rayleigh amplitude values is built by summing two squared Gaussian random variables (x(i), y(i)) and by taking the square root of the result. Channel correlation is taken into account by applying a low pass filter to the sequence of Gaussian values before squaring and summing them. The low pass filter used to account for channel correlation is built by assuming the speed of the mobile station. Given such a speed, the Doppler frequency $f_{dopp}$ of the channel can be calculated through the formula $$f_{dopp} = \frac{v_{mob}}{c_0} f_0, \quad (1)$$

where $v_{mob}$ is the speed of the mobile station, $c_0$ is the speed of light, and $f_0$ is the carrier frequency.

For a broad range of parameters, the sequence of data-block success and failure can itself be approximated by means of a simple two-state Markov chain, seen in FIG. 7, which can be used in modeling the fading channel seen in FIG. 6. The two-state Markov chain, also known as the Gilbert Model, has "1" for the received state and "0" for the loss state. This model is able to capture the dependence between consecutive losses. Network packets can be represented as a binary time series, $$\{x_i\}_{i=1}^n,$$

where $x_i$ takes 1 if the ith packet has arrived successfully and 0 if it is lost. The current state, $X_i$, of the stochastic process depends only on the previous value, $X_{i-1}$. The transition probabilities between the two states are calculated as follows:

$$p = P[X_i = 1 | X_{i-1} = 0] \text{ and } q = P[X_i = 0 | X_{i-1} = 1]. \quad (2)$$

The maximum likelihood estimators of p and q for a sample trace are:

$$\hat{p}=n_{01}/n_0 \text{ and } \hat{q}=n_{10}/n_1, \quad (3)$$

where $n_{01}$ is the number of times in the observed time series when 1 follows 0 and $n_{10}$ is the number of times when 0 follows 1. $n_0$ is the number of 0s and $n_1$ is the number of 1s in the trace.

As seen in FIG. 5a, two components that are considered with respect to the W-CDMA channel are the foregoing fading and Average White Gaussian noise (AWGN) factors discussed above.

Having generated a statistical model of the communication channel, the error control module can then employ one or more error control schemes to reduce the distortion being experienced.

5. Resource Allocation Scheme

The three primary resources available for wireless access are bandwidth, space, and power. These resources must be allocated efficiently and dynamically in a mobile wireless environment. The objective of resource allocation in wireless networks is to decide how to allocate resources such that quality of service (QoS) level requirements of the applications requiring by the multimedia streams can be satisfied.

To design an efficient resource allocation scheme, several difficulties should be taken into consideration. First, due to the multi-path fading effect, the wireless channel is time varying. Second, the radio bandwidth and power are scarce resources. Third, multiple classes of traffic have different data rates and bit error rate requirements. To cope with all these problems, the proposed scheme needs to be adaptive, efficient, flexible, and able to minimize the transmitted power, while satisfying the application QoS requirements.

The resource allocation problem is a special case of the general problem of decentralized dynamic decision-making. A well-developed theoretical foundation for this general problem is currently lacking. A general desire in a resource allocation mechanism is the minimization of the overall distortion, thus gaining the optimized quality of the global streams. One can denote the sending rate of ith media stream by $r_i$, the distortion that will be obtained in this stream can be denoted by $d_i$, and the quality impact degree of this stream can be denoted by $\alpha_i$. Such a problem can be expressed as: Minimize $$D = \sum_i \alpha_i \times d_i,$$

subject to $$R = \sum_i r_i \leq R_T,$$

where $R_T$ is the total bit budget for the W-CDMA channel, which is 384 kbps in wide area with high mobility and 2 Mbps in a local area.

Each media has its own rate and distortion relationship: $R_i=F(D_i)$. The above optimization problem relies on this Rate and Distortion (R-D) function. Considering the unique wireless link characteristics such as bit error rate and fading depth, the corresponding R-D function has to be modified to account, in the wireless link, for distortion comprising the source distortion and the channel distortion. To this end, there is derived an R-D function for the MPEG-4 Progressive Fine Granular Scalability (PFGS) scalable codec, and an implementation that dynamically allocates bits between the source bit stream and the channel coding. A discussion follows of the R-D function for resource allocation for 3G networks, given the rate-distortion function in the context of error rate and throughput measurements.

Figure 5B:
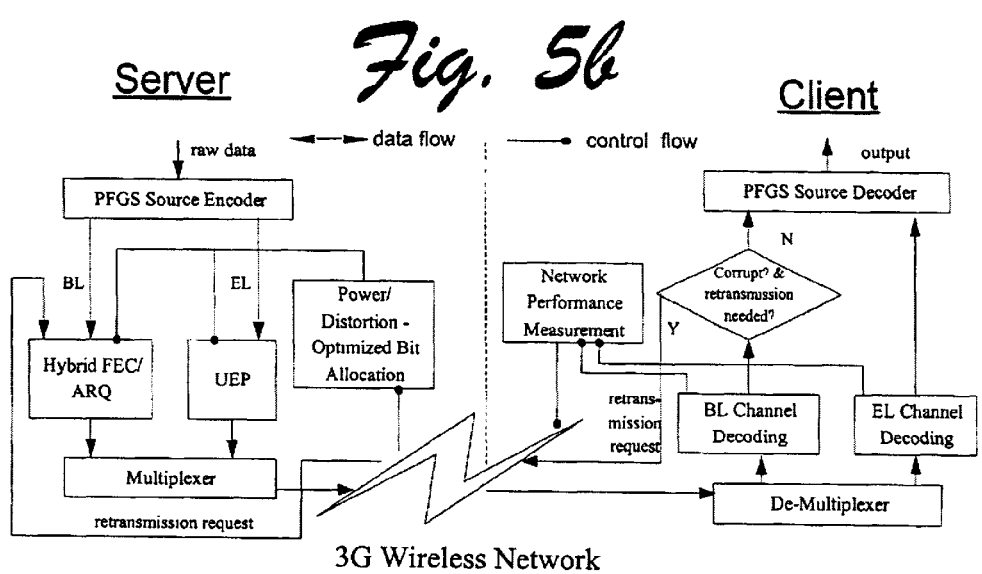
FIG. 5b is a block diagram of an implementation of a hybrid Unequal Error Protection (UEP)/delay-constrained ARQ scheme for PFGS delivery over a wireless 3G network.

An implementation, an example of which is seen in FIGS. 1b and 5b, is proposed for a distortion-minimized resource allocation and a power-minimized resource allocation with a hybrid delay-constrained ARQ and Unequal Error Protection (UEP) for video transmission over a 3G wireless network, based on the measurements of throughput and error rate for the 3G wireless network. The architecture seen in FIGS. 1b and 5b has the components of the network throughput/error rate measurement and distortion/power optimized resource allocation, each of which is discussed below.

In the discussion that follows, measurements of throughput and error rate for a 3G wireless network are presented in Section 6. Section 7 presents preliminaries for a QoS level adaptive resource allocation. In Section 8, an implementation of distortion-optimized and power-optimized resource allocation schemes are presented, which schemes consider varying media characteristic and adapt to channel condition. Section 9 gives simulation results of the implementations discussed herein.

Figure 9A:
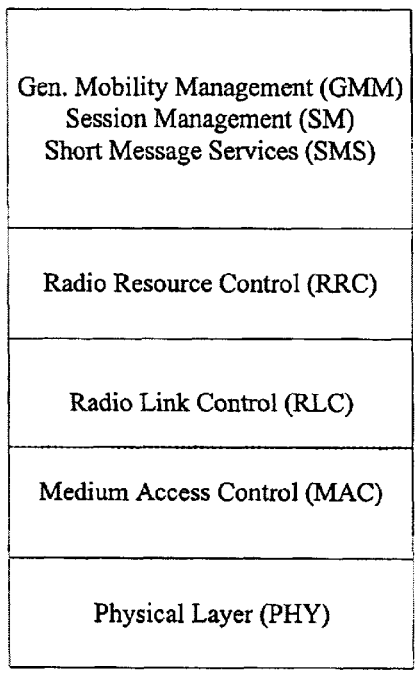
FIGS. 9a and 9b show different 3G protocol stacks, where
Figure 9B:
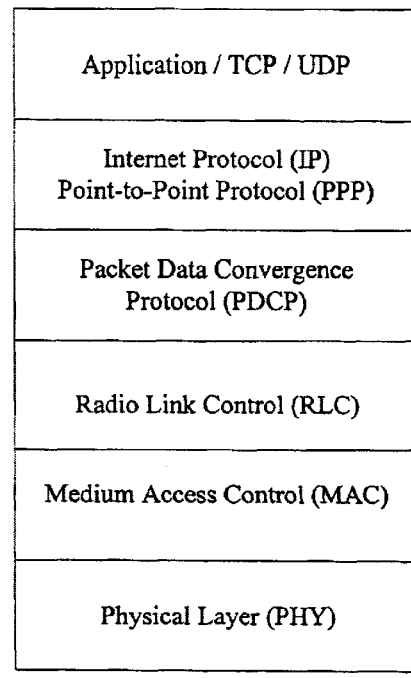

6. Measurements Of Error Rate And Throughput in a 3G Network 6.1 Protocol Stack of 3G Network A typical protocol stack for a 3G network is shown in FIGS. 9a and 9b, consisting of a control-plane stack in FIG. 9a and a user-plane protocol stack in FIG. 9b. The control plane is used for 3G-specific control signaling. More specifically, GMM/SM/SMS is in charge of general mobility management, session management, and short message services, respectively. The Radio Resource Control (RRC) sublayer of the Data Link Layer interacts with lower layers to provide local inter-layer control services, such as determining the transport format combination set (TFCS), for efficient usage of transport channels.

All information sent and received by a user is transported via the user plane. Application data is first packetized and then transported using the TCP/UDP transport protocol. For multimedia delivery that is discussed herein, UDP protocol is used. It shall be assumed that the UDP packet size is $L_U$ bytes including the header information.

In between the UDP of the Transport Layer and the Data Link Layer, and within the Network Layer, there is the Internet Protocol (IP) sublayer, the Point-to-Point Protocol (PPP) sublayer, and the Packet Data Convergence Protocol (PDCP) sublayer.

The Radio Link Control (RLC) sublayer of the Data Link Layer provides three types of modes for data delivery, among which, the transparent mode transmits higher layer Protocol Data Units (PDUs) only with segmentation/reassembly functionality. The unacknowledged mode transmits higher layer PDUs without guaranteeing delivery but with a user-defined maximal number of retransmissions. The acknowledged mode transmits higher layer PDUs with guaranteed error-free delivery. Considering the multimedia characteristic, the transparent and unacknowledged modes are discussed for one implementation. The length of an RLC data unit, called a frame, is of $L_L$ bytes. Thus, a UDP packet is segmented into $N_L = \lceil L_U/L_L \rceil$ RLC frames for transmission. The number of retransmissions allowed for a failed RLC frame is denoted as $N_R$.

The Medium Access Control (MAC) sublayer of the Data Link Layer functions in the selection of an appropriate transport format for each transport channel according to the instantaneous source rate. The transport format defines the transport block size (size of the RLC frame in transparent and unacknowledged modes), the transport block set size, the transmission time interval (TTI), the error detection capability (size of CRC), the error protection (channel coding) rate, etc. On the receiver side, after decoding the Transport Format Combination Indicator (TFCI) information, users can obtain the bit rate and channel decoding parameters for each transport channel.

Figure 10:
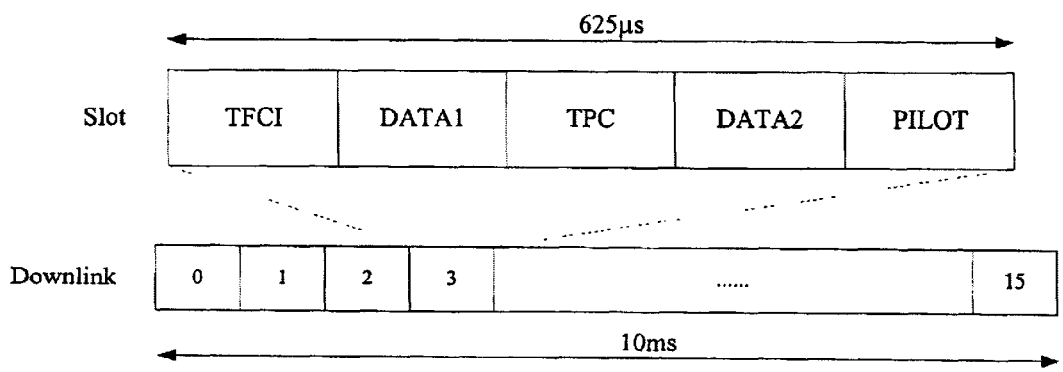
FIG. 10 illustrates for a downlink, Transport Format Combination Indicator (TFCI) (TFCI) information, Transmission Power Command (TPC), and pilot symbols that are time-multiplexed with data symbols.

The Physical Layer (PHY) offers information transfer services to the MAC sublayer of the Data Link Layer and also to higher layers. One of the main services provided by the Physical Layer is the measurement of various quantities, such as the physical-channel bit error rate (BER), the transport-channel block error rate (BLER), the transport-channel bit rate, etc. In the Physical Layer, each physical channel is organized in a frame structure, which consists of 16 slots. For the downlink, TFCI, TPC (Transmission Power Command) and pilot symbols are time-multiplexed with data symbols, as seen in FIG. 10. On the receiver side, once a slot is received, pilot symbols are used to estimate the channel status. With the prior known pilot information, channel estimation can be performed through some filtering techniques such as a weighted multi-slot average (WMSA) filter, a Gaussian filter, and a Wiener filter. Then, the Bit Error Rate (BER) of the physical channel before channel decoding can be calculated. At the end of each TTI, TFCI information is decoded. With the TFCI information, the channel decoding parameters of each transport channel is obtained, and in the meanwhile, the bit rate ($B_{trans}$) of each transport channel can be computed. Based on the error detection capability (CRC) evaluation of each transport block, the average Block Error Rate (BLER), $P_{BL}$, of the transport channel can be estimated. All these measured information are reported to the higher Data Link Layer for system performance analysis.

6.2 RLC Frame Model of Correlated Fading Channel

The traditional metric used for characterizing channel errors is average bit error rate or the average Block Error Rate (BLER), $P_{BL}$. After obtaining $P_{BL}$, there still exists a need for selecting an appropriate model to analyze the system performance in the Data Link Layer. A first-order Markov process can be used in modeling a transmission on a correlated Rayleigh fading channel as was summarized in Section 4, above, in reference to FIGS. 6 and 7. As seen in FIG. 5a, two components that are considered for the W-CDMA channel are the fading and the Average White Gaussian noise (AWGN) factors discussed in Section 4, above.

A sequence of transport blocks' successes and/or failures can be approximated by a two-state Markov chain, which is defined by the transition matrix $$M(x) = \begin{pmatrix} p(x) & r(x) \\ s(x) & q(x) \end{pmatrix} = \begin{pmatrix} p & 1-p \\ 1-q & q \end{pmatrix}^x, \quad (4)$$

where p and 1−q are the probabilities that the $j^{th}$ transport block transmission is successful, given that the $(j-1)^{th}$ transport block transmission was successful or unsuccessful, respectively. Using this model, the steady-state transport block error rate, $P_{BL}$, is given by $$P_{BL} = \frac{1-p}{2-p-q}. \quad (5)$$

For a Rayleigh fading channel with fading margin F, the average transport block error rate BLER, $P_{BL}$, and the Markov parameter (q) can be expressed as $P_{BL}=1-e^{-1/F}$ (5) and $$q = 1 - \frac{Q(\theta, \rho\theta) - Q(\rho\theta, \theta)}{e^{1/F} - 1}, \quad (6)$$

$$\text{where } \theta = \sqrt{\frac{2/F}{1-\rho^2}}. \quad (7)$$

In Eq. (7), $\rho=J_0(2\pi f_d T)$ is the correlation coefficient of two successive samples (spaced by T seconds, which equals 10 ms, 20 ms, 40 ms, or 80 ms in 3G network) of the complex Gaussian fading channel, $f_d$ is the Doppler frequency that is equal to the mobile velocity divided by the carrier wavelength. $J_0(.)$ is the Bessel function of the first kind and zero order, and $Q(.,.)$ is the Marcum-Q function given by:

$$Q(x, y) = \int_y^\infty e^{-\frac{(x^2+w^2)}{2}} I_0(xw) w\, dw. \quad (8)$$

Thus, the relationship between block error rate and Markov parameter can be easily represented as follows:

$$q = 1 - \frac{(1-P_{BL}) \times (Q(\theta, \rho\theta) - Q(\rho\theta, \theta))}{P_{BL}}, \quad (9)$$

$$\text{where } \theta = \sqrt{\frac{-2\log(1-P_{BL})}{1-J_0^2(2\pi f_d T)}}. \quad (10)$$

Notice that, in order to use this approximation approach to compute p and q, there is a need to compute the average transport block error rate, $P_{BL}$, which depends on the details of the modulation/coding scheme. One can obtain this information at the end of each TTI in a 3G network. Another factor that will affect the Markov parameter is the velocity of the mobile station. The decimation method and the statistical analysis of receiving signal method can be used to estimate the velocity of the mobile station.

6.3 Throughput Measurement

RLC in a 3G network supports the transparent, unacknowledged, and acknowledged modes of operations. The upper-layer packet is segmented into small RLC frames, and different retransmission polices are adopted for different RLC modes. The performance measurement of interest is the end-to-end throughput considering the interaction of RLC and the upper layer, which in one implementation is the UDP.

In one implementation, the unacknowledged RLC mode is used. One can denote the number of retransmissions allowed for a failed RLC frame as NR, and the number of RLC frames per UDP packet as $N_L$. When the RLC sublayer of the Data Link Layer finds a frame error, it sends back a NACK requesting retransmission of the corrupted frame. RLC will abort the attempt after $N_R$ unsuccessful retransmissions and pass the frame to the UDP of the Transport Layer. Note that, so long as one RLC frame is lost in a UDP packet, the entire UDP packet is discarded.

As mentioned above, TFCI information is decoded at the end of each TTI on the receiver side. With the transport block set size, TTI, and other related information obtained by TFCI, the total bandwidth used for each transport channel ($B_{trans}$) can be calculated. To accurately estimate the available throughput in the Application Layer, the status of successive UDP packets are analyzed. Let $P_{u,ss}$ and $P_{u,fs}$ be the probabilities that the current UDP packet is successful given that the previous UDP packet was successful or not. Further let $P_{u,sf}=1-P_{u,ss}$ and $P_{u,ff}=1-P_{u,fs}$. Then, the available UDP throughput can be defined as $$AUB = B_{trans} \times \frac{1 - P_{u,ff}}{2 - P_{u,ss} - P_{u,ff}} = B_{trans} \times \frac{1 - P_{u,fs}}{1 + P_{u,fs} - P_{u-ss}}. \quad (11)$$

To calculate the packet transition probabilities, several denotations are introduced. Let $$P_{ul,sf}^{(n)}$$

be the probability that the last RLC transmission of the current UDP packet with n RLC frames is successful given that the current UDP packet is a failure, let $$P_{ul,ss}^{(n)}$$

be the probability that the last RLC transmission of the current UDP packet with n RLC frames is successful given that the current UDP packet is a success, let $P_{lu,sf}$ be the probability that the current UDP packet is failed given that last RLC transmission of the previous UDP packet was a success, and let $P_{lu,ff}$ be the probability that the current UDP packet is failed given that last RLC transmission of the previous UDP packet was a failure. Then, the UDP packet transition probabilities can be represented as $$P_{u,ss} = (1 - P_{lu,sf})P_{ul,ss}^{(N_L)} + (1 - P_{lu,ff})(1 - P_{ul,ss}^{(N_L)}) \text{ and} \quad (12)$$

$$P_{u,fs} = (1 - P_{lu,sf})P_{ul,sf}^{(N_L)} + (1 - P_{lu,ff})(1 - P_{ul,sf}^{(N_L)}), \quad (13)$$

where $$P_{ul,ss}^{(n)} = 1,$$

for any n, and $$P_{ul,sf}^{(n)}$$

can be derived in a recursive way as follows:

$$P_{ul,sf}^{(n)} = P_{ul,sf}^{(n-1)} \left( p + (1-p) \times \sum_{j=0}^{N_R} q^j \times (1-q) \right) + \quad (14)$$

$$(1 - P_{ul,sf}^{(n-1)}) \left( \sum_{j=0}^{N_R} q^j \times (1-q) \right).$$

To represent $P_{lu,sf}$ and $P_{lu,ff}$, another two denotations are introduced. Let $p_n$ be the probability that at least 1 out of n RLC frames fails given that the first RLC transmission was a success. Let $q_n^{(k)}$ be the probability that at least 1 out of n RLC frames fails given that the first RLC frame already had $k \leq N_R$ retransmissions and current RLC transmission is a failure. Then there is obtained:

$$P_{lu,sf} = p \times p_{N_L} + (1-p) \times q_{N_L}^{(0)} \text{ and} \quad (15)$$

$$P_{lu,ff} = (1-q) \times p_{N_L} + q \times q_{N_L}^{(0)}, \text{ where} \quad (16)$$

$$p_n = p \times p_{n-1} + (1-p) \times q_{n-1}^{(0)} \text{ and} \quad (17)$$
$$q_n^{(k)} = (1-q) \times p_{n-1} + q \times q_n^{(k+1)}.$$

Notice that the terminating conditions for the above recursive relation are $p_1=0$, $q_n^{(N_R)}=1$, and $q_1^{(k)}=q^{(N_R-k)}$.

Up to now, the relationship between the available UDP throughput and RLC frame transition probabilities had been derived. After a user-defined time interval, all the performance measurement information, such as available UDP throughput, frame/packet transition probabilities, BER/BLER, etc., are reported to the Application Layer. The resource allocation for multimedia transmission then can be performed based on the provided information.

7. Preliminaries for QoS Level Adaptive Resource Allocation

A discussion that follows is of rate-distortion and rate-power consumption relations for a source coder and for a channel coder. Since a video-streaming scenario is considered in one implementation, a focus will be placed upon the source decoding and channel decoding in the following sections.

7.1 Rate-Distortion Relation for Source and Channel Coding

Figure 11:
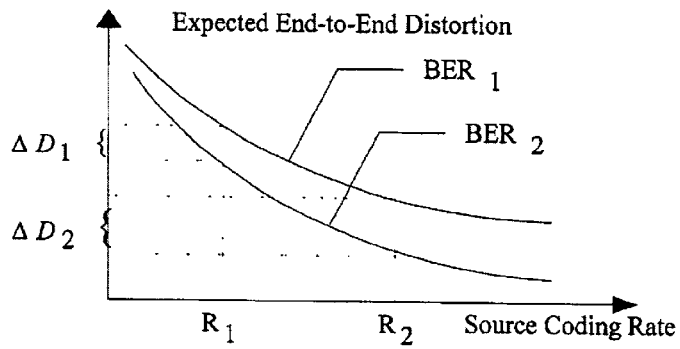
FIG. 11 shows the Rate-distortion relation with different channel conditions.

Most existing video source coders are optimized to achieve the best performance at a certain rate while assuming that all of the coded bits are correctly received. When video media is delivered over a wireless channel, the channel transmission error in the random location causes additional channel distortion. Thus, there is defined end-to-end performance using the expected end-to-end distortion, $D_T$, which is composed of the source distortion and the channel distortion. Mathematically, $D_T=D_s+P_{fail}\times D_c$, where $D_s$ is the source distortion that is caused by the video rate control, $D_c$ is the channel distortion resulting from random transmission error and burst-fading error, and where $P_{fail}$ is the probability that a video packet transmits unsuccessfully. Notice that $P_{fail}$ is related to the channel bit error rate (BER) and bursty length. As seen from FIG. 11, different channel conditions may have different impacts on the expected end-to-end distortion. That is, (BER$_1\neq$BER$_2$) & (R$_1\neq$R$_2$)$\rightarrow\Delta$D$_1\neq\Delta$D$_2$.

In one implementation, source is encoded by a layered scalable coder, e.g., MPEG-4 PFGS video coder, which can generate bit rates anywhere from tens of kilobits to a few mega bits per second with arbitrarily fine granularity. An example of this encoding is seen in FIG. 5b where raw data, such as raw video, is input to a PFGS Source Encoder. The raw video is encoded into two parts: one part is a called base layer (BL) that carries the most important information, such as motion vector information, etc., while the other part is a plurality of called enhancement layers (ELs) that carry less importance information. Furthermore, layers of the same frame in PFGS are correlated. Specifically, the higher layer information relies on the corresponding one in the lower layers. On the receiver side, if any residual error occurs in the lower layers, the corresponding information bits in the higher layers will be discarded whether they are correct or not. Thus, the expected end-to-end distortion of PFGS can be represented as $$D_T = D_s + \sum_{j=1}^{L} \left\{ \sum_{m=1}^{n_j} D_{c,packet}(m, j) \times \right. \quad (18)$$

$$\left. \left[ P_{fail,packet}(m, j) \left| \prod_{i=1}^{j-1} (1 - P_{fail,packet}(m, i)) \right| \right] \right\},$$

where L represents the number of layers that can be delivered, $n_j$ denotes the number of packets in the $j^{th}$ layer, $D_{c,packet}(x, y)$ represents the channel distortion caused by loss of the $x^{th}$ packet in the $y^{th}$ layer, and $P_{fail,packet}(x, y)$ is the probability that the $x^{th}$ packet in the $y^{th}$ layer is lost. Notice that the dependency relationship among different layers is embodied by the conditional probability as expressed in Eq. (18).

Next a discussion will be had of rate-distortion caused by a channel decoder including FEC and ARQ. In one implementation, Reed-Solomon (RS) codes are used for FEC. The RS codes are used because of their abilities to correct channel burst errors, which are common in a wireless channel. An RS code is represented as RS (n, k), where k is the length of source symbols and n−k is the length of protection symbols. It is known that an RS code usually can correct up to $$t = \left\lfloor \frac{n-k}{2} \right\rfloor$$

symbol errors. The failure probability of an RS (n, k) code is defined as:

$$P_{fail} = 1 - \sum_{j=0}^{t} P(n, j), \quad (19)$$

$$P(n, j) = \sum_{i=0}^{j} \binom{n}{i} p_s^i (1 - p_s)^{n-i}, \quad (20)$$

$$p_s = 1 - (1 - p_b)^m, \text{ and} \quad (21)$$

$$p_b = Q\left(\sqrt{\frac{2E_b}{N_0}}\right), \quad (22)$$

where P(n, j) represents the probability of less than j symbol errors occurs in the n symbol's transmission, $p_s$ is the probability of symbol transmission error, m is the number of bits per symbol, $p_b$ is the bit-error probability, $E_b$ is the fixed power per bit, and $N_0/2$ is the channel noise variance.

Figure 12:
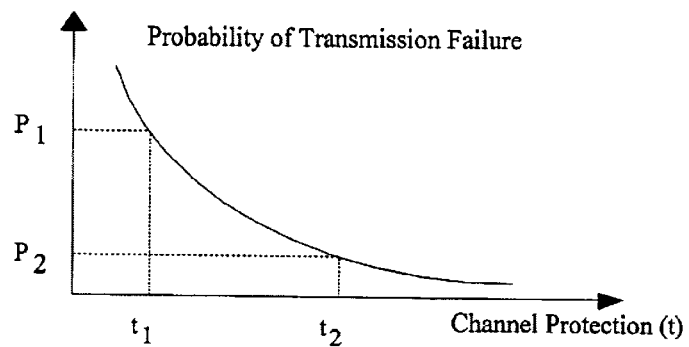
FIG. 12 shows the relationship of the channel protection level and the probability of transmission failure.

Based on the above analysis, it can be deduced that increasing channel protection can reduce possible channel errors, which in turn decreases the end-to-end distortion. That is, $t_2 > t_1 \rightarrow P_2 < P_1$, as shown in FIG. 12.

As for ARQ, selective retransmission is adopted as retransmission policy in one implementation. In this implementation, only the loss/corrupted packets would be retransmitted across the channel. Notice that retransmission of corrupted data introduces additional delay, which is desirable for real-time applications. Therefore, in real-time media delivery, the delay bound of media should be considered as a constraint for retransmission.

The probability of packet transmission failure after the $n^{th}$ retransmission is defined as: $P_{fail,packet}^{(n)} = (1 - P_{s,packet})^n$ (23)

and $P_{s,packet} = (1 - p_b)^{len}$, (24)

where $P_{s,packet}$ is the probability that the packet can be correctly transmitted, and len is the number of bits in the packet. Suppose $N_{max}$ is the maximum number of times for retransmission of a certain packet, the rate needed for the packet transmission can be represented as:

$$R = R_s + \sum_{i=1}^{N_{max}} P_{fail}^{(i)} \times R_s. \quad (25)$$

Figure 13A:
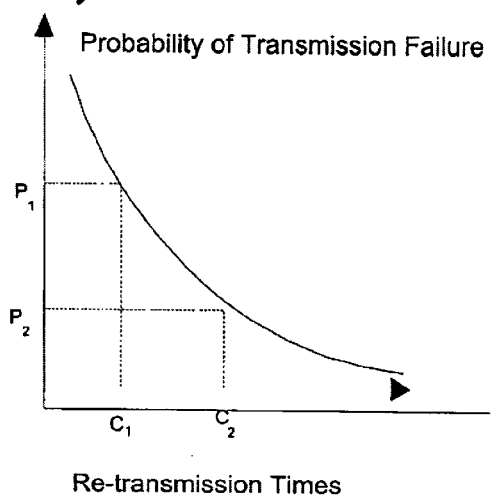
FIG. 13a shows the probability of transmission failure versus re-transmission times.
Figure 13B:
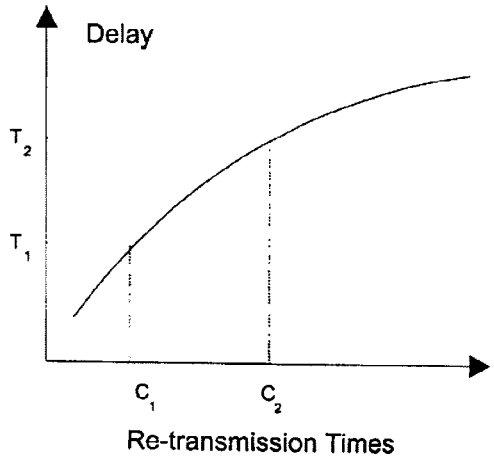
FIG. 13b shows the delay caused by an implementation of an Automatic Retransmission reQuest (ARQ) scheme versus re-transmission times.

Based on the above analysis, with the higher retransmission times, a lower probability of transmission failure can be obtained, thereby causing larger delay. This is plotted in FIGS. 13a and 13b.

7.2 Rate-Power Consumption For Source And Channel Coding

The total power consumed in a system consists of communication power and processing power. For the source part on the receiver side, the communication power refers to the source receiving power, which is relatively small compared with the source processing power and is only related to the received source bit rate, while the processing power is the power consumed for source decoding. For simplicity, complexity is used in one implementation to represent the processing power consumption. To be specific, the more complex an algorithm is, the more processing power would be consumed. Coding standards are, in general, compromises between computational complexity and performance. Specifically, with higher complexity, smaller distortion can be achieved, and vice versa.

Figure 14A:
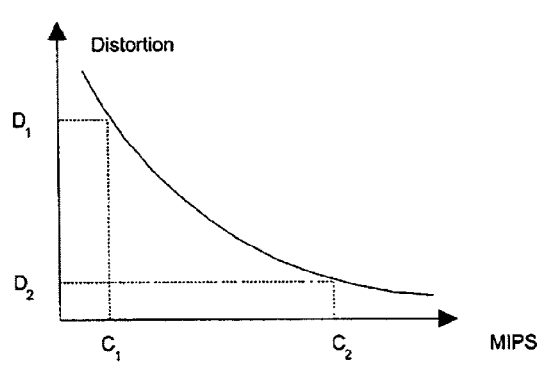
FIGS. 14a and 14b show the general relations of distortion-complexity and complexity-power, where
Figure 14B:
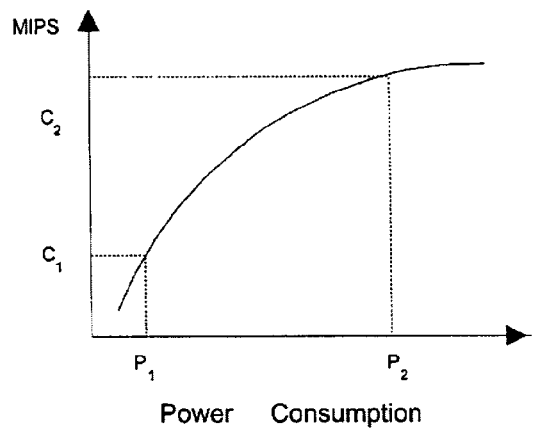

FIGS. 14a and 14b depict the general description of the relationship between distortion and complexity as well as the relationship between complexity and processing power consumption. It can be seen that with higher complexity, smaller distortion can be achieved, while with higher complexity, more processing power will be consumed. That is, $C_2 > C_1 \rightarrow D_2 < D_1$ and $C_2 > C_1 \rightarrow P_2 > P_1$.

Figure 15:
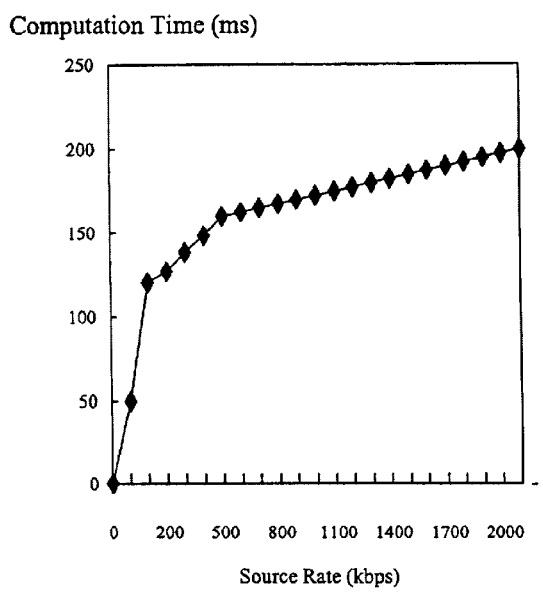
FIG. 15 shows the rate-power relation for Progressive Fine Grain Scalability (PFGS) source decoding in a graph of consumption time (ms) vs. source rate (kbps).

In one implementation, the CPU computation time is used to measure the complexity of the decoding algorithm. Specifically, for PFGS source decoding, the processing power consumed in the base layer (BL) mainly consists of motion compensation, inverse discrete transform (IDCT), and quantization, while the processing power consumed in the enhancement layers mainly consist of IDCT and quantization. The rate-power relation for PFGS source decoding is illustrated in FIG. 15. An example of PFGS source decoding is seen in FIG. 5b where the BL Channel Decoding and EL Channel Decoding are input to a PFGS Decoder for output within a wireless client.

Figure 16:
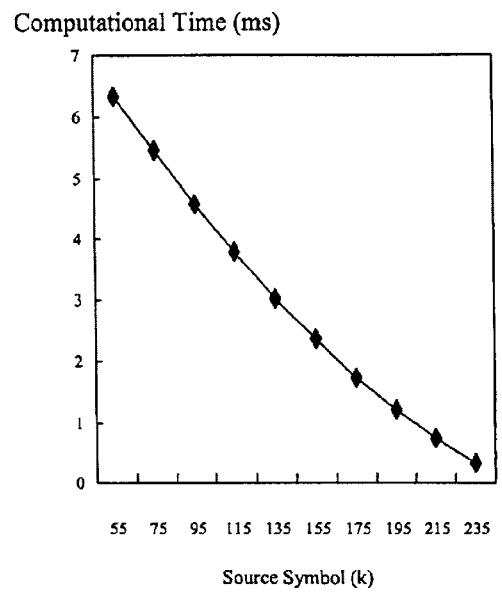
FIG. 16 shows the rate-power relation for RS decoding in a graph of consumption time (ms) vs. source symbol (k).

Similar to the source part, the communication power consumed by the channel code-decode (codec) on the receiver side refers to the channel receiving power, which is related to the received channel protection rate, while the processing power is the power consumed for channel decoding. Compared with the channel receiving power, processing power is dominated in power consumption in channel decoding. The majority of the processing power consumption by the RS codec is due to the RS decoder. The energy consumption for decoding an RS (n, k) code per codeword is:

$$\epsilon_{dec/codeword} = (4tn+10t^2)\epsilon_{mult} + (4tn+6t^2)\epsilon_{add} + 3\epsilon_{inv}, \quad (26)$$

where $\epsilon_{mult}$, $\epsilon_{add}$, and $\epsilon_{inv}$ represent the energy consumed in the m×m−bit multiplier, m-bit addition, and m-bit inversion, respectively. Similar to the source side, the computation time is used to represent the consumed processing power of the channel. The rate-power relation for RS decoding is depicted in FIG. 16.

8. QoS Level Adaptive Resource Allocation for Scalable Video Transmission Over 3G Wireless Networks Channel performance measurement was discussed in Section 6, above. The problem now to be discussed in this Section 8 is how to efficiently utilize the limited channel capacity. According to the analysis in the previous Section 7, above, both source coding by a source encoder and channel coding by a channel encoder will occupy certain portion of resources (e.g., bits and processing power), thereby making different contributions to the end-to-end QoS level, such as distortion, delay, and power consumption. The study of resource allocation in this Section 8 is to address the problem of finding the optimal distribution of resources among a set of competing subscribers (e.g., source coder and channel coder) that minimizes the objective function, such as distortion or power consumption, subject to total resource constraints and/or QoS level requirements.

An example of resource allocation is seen in FIG. 5a, where the server implements a Resource Allocation module that includes the Rate-Quality relation, Buffer Control, Power Control, and Handoff notification to be fed back via the Network Layer.

In one implementation of a resource allocation scheme, the objective function O is the sum of an individual subscriber's objective function $o_i$, subject to the sum of the individual subscriber's required resource $r_i$, which would not exceed the resource limit R, and/or the sum of the individual subscriber's QoS level requirement $q_i$, which would not exceed the total QoS level requirement Q. Mathematically, $$\min_{\{q_i, \text{and/or } r_i\}} O = \sum_{i=1}^{N} o_i(q_i, r_i) \text{ subject to} \quad (27)$$

$$\sum_{i=1}^{N} q_i \leq Q \text{ and/or } \sum_{i=1}^{N} r_i \leq R,$$

where N is the number of subscribers.

Figure 17:
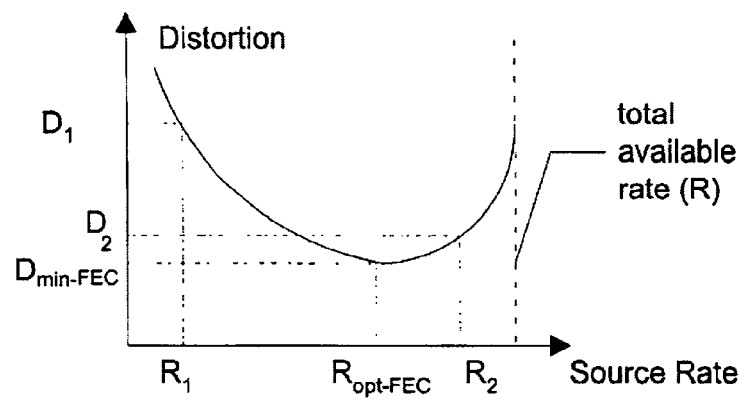
FIG. 17 shows the rate-distortion relation with an implementation of a Forward Error Correction (FEC) scheme in a graph of distortion vs. source rate.

In one implementation, resource distribution between the PFGS source coder and the channel coder is based on the above formulation. From the rate-distortion relation analyzed in the previous section, it is essential to adopt some error protection schemes so as to reduce the distortion caused by channel transmission. FEC is suited for real-time communications, but varying channel condition limits its effective use, because a worst-case design may lead to a large amount of overhead. Once the channel condition is known, adaptive FEC can be adopted to meet the channel condition. Specifically, if the network condition is good, the error correction rate will be reduced. On the other hand, if the network condition is bad, the error correction rate will be increased. As shown in FIG. 17, there exists an optimal rate ($R_{opt-FEC}$) for FEC scheme to achieve the minimal distortion ($D_{min-FEC}$).

Figure 18A:
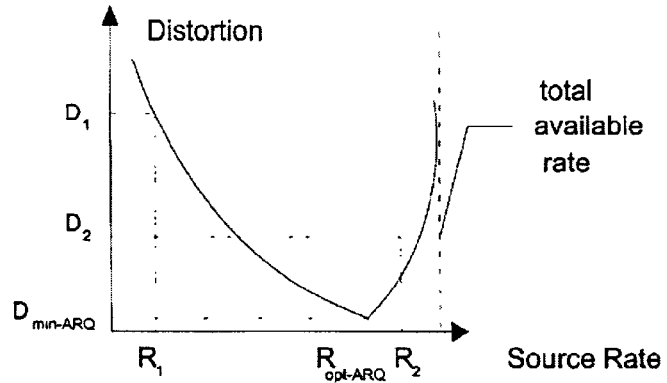
FIGS. 18a–18b show rate-distortion with an implementation of an ARQ scheme and delay caused by the implemented ARQ scheme, where
Figure 18B:
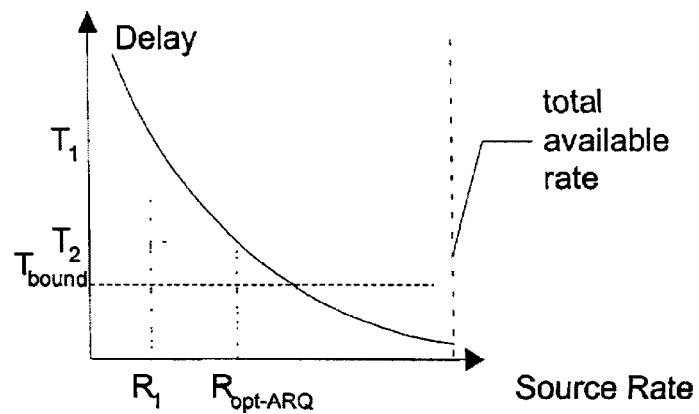
Figure 19:
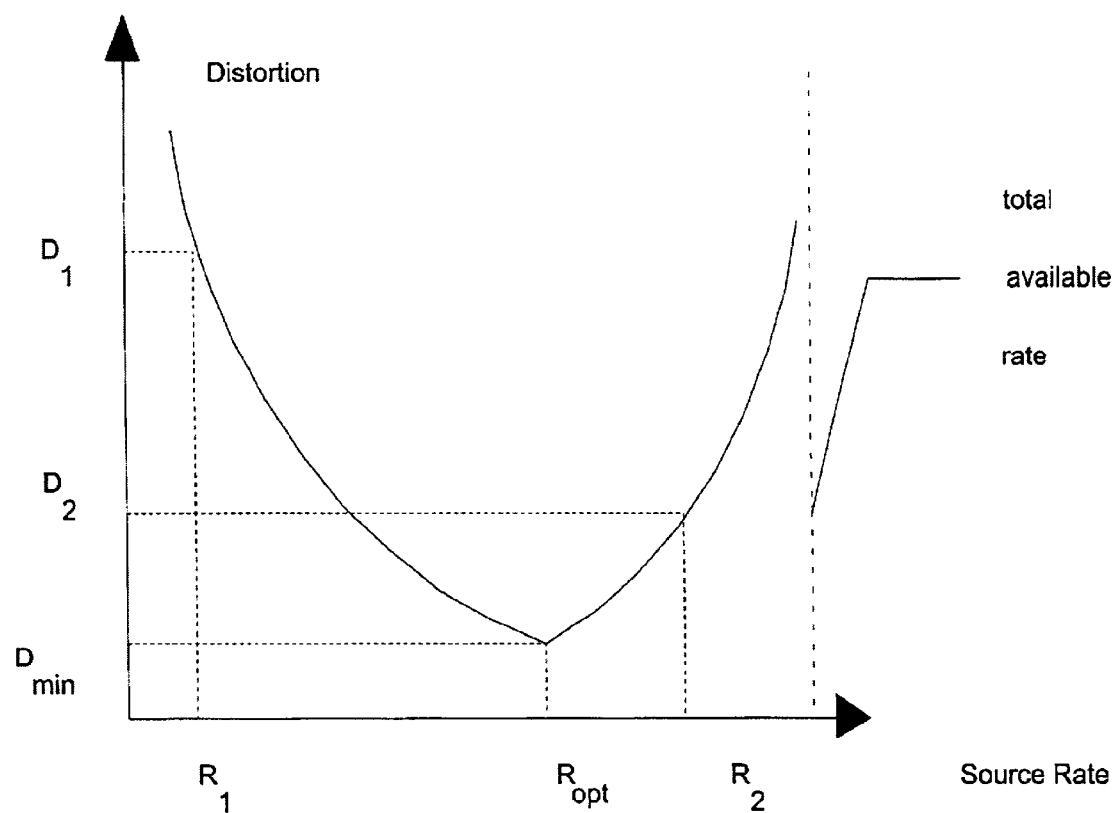
FIG. 19 shows the rate-distortion relation with an implementation of a hybrid UEP/delay-constrained ARQ scheme in a graph of distortion vs. source rate.

Closed-loop error control techniques such as ARQ have been shown to be more effective than FEC. But retransmission of corrupted data frames introduces additional delay, which is critical for real-time services. As shown in FIGS. 18a and 18b, there exists an optimal rate ($R_{opt-ARQ}$) for ARQ scheme to achieve the minimal distortion ($D_{min-ARQ}$). It can be seen that $D_{min-ARQ} \leq D_{min-FEC}$. However, in real-time applications such as conferencing and streaming, the delay constraint had to be considered. When considering media's delay constraint ($T_{bound}$), the optimal distortion, $D_{min-ARQ}$, cannot be guaranteed to be achieved. Therefore, a hybrid FEC and a delay-constrained ARQ are introduced as the error protection scheme for multimedia delivery.

8.1 Hybrid UEP and Delay-Constrained ARQ for Scalable Video Delivery

FIG. 5b is a block diagram of an example of a server in communication with a wireless client through a 3G wireless network. FIG. 5b is an expansion upon the architecture seen in FIG. 1b. The server implements a distortion and power optimization scheme in accordance with an implementation of the invention, described in Section 5 above, in the allocation of bits. The wireless client communicates retransmission requests back to the server. The server uses the retransmission requests from the wireless client in its distortion and power optimization scheme.

The server also implements a hybrid UEP and delay-constrained ARQ scheme for scalable video delivery in which the server transmits a response to a service request for a multimedia stream to the wireless client over the 3G wireless network. In this scheme, Base Layers (BL) and Enhancement Layers (EL) are protected differently. Because the BL carries the significant information, it should be transmitted in a well-controlled way to prevent the quality of reconstructed video from degrading severely. Therefore, strong error protection codes are added for BL. Note that how much protection should be added to the BL is based on the channel condition and available resources. As analyzed above, FEC usually incurs overhead, and the ARQ scheme is usually more efficient than FEC provided certain delay is allowed. As a result, there is adopted a hybrid delay-constrained ARQ and FEC for the BL error protection.

The Hybrid ARQ and Hybrid FEC of FIG. 5b are depicted contextually within the Application Layer Quality of Service Level Adaptation scheme seen in FIG. 4. The Power/Distortion Optimized Bit Allocation module seen in FIG. 5b is depicted contextually within the Distortion/Power Optimized Resource Allocation module 216 of server 200 seen in FIG. 1c, and represents an implementation of the functionality of the Resource Allocation module of the Server seen in FIG. 5a.

A discussion follows of the operation of the hybrid delay-constrained ARQ and FEC for the BL error protection. On the sender side, based on the delay constraint $D_{constrained}$ that is limited by video frame rate, current roundtrip transmission time RTT, and the estimated time consumed by processing procedure $D_{processing}$, the maximum number of transmissions for current packet $N_{max}$ can be calculated as follows:

$$N_{\max} = \frac{D_{constrained} - D_{processing}}{RTT}. \quad (28)$$

Then, the sender determines the level of protection for each transmission such that the required residual error rate is within the desired range and the overhead is minimized.

As for ELs, different levels of error protections are added to the different layers. This is because error occurring in the lower layer may heavily corrupt the corresponding higher layers in the same frame and thus affect several subsequent frames. In other words, a bit error would result in error propagation. As a result, the bandwidth for higher layers is wasted, and in the meanwhile, the video quality is deteriorated. Note that, in order to efficiently add error protection to ELs, the sender determines the degree of protection for each layer adapting to the current channel condition for achieving the minimal objective function under the required QoS level and resource constraints.

FIG. 5b illustrates one implementation of the scheme. The 3G network performance is first dynamically measured. Total available throughput, bit/frame/packet error rate, and some other network related information are fed back to the sender. Given the network information, optimal resource allocation is then performed to achieve the minimal objective (e.g., distortion or power consumption). The channel decoder reconstructs packets through a channel decoding process. For ELs, the output of the channel decoder is directed for source decoding; while for BLs, if residual error still exists, the receiver decides whether to send a retransmission request based on the delay bound of the packet. If the delay bound has expired, the request will not be sent. Otherwise, when receiving a retransmission request, the sender only transmits a necessary higher protection part for the corresponding packet.

In summary, the proposed error protection scheme is aimed to achieve adaptiveness and efficiency within the constraint of the bounded delay. However, the hybrid UEP and delay-constrained ARQ protection scheme poses a challenging resource allocation problem, because one has to consider two issues simultaneously: the tradeoff of allocation between the source and channel codes and the tradeoff between forward error protection and retransmission.

8.2 Distortion-Minimized Resource Allocation

Channel bandwidth capacity is highly limited in wireless networks. The allocation on the source side has a tradeoff between the source coding rate and the source distortion, the FEC has a tradeoff between the error protection rate and the channel distortion, and the ARQ has a tradeoff between the retransmission times and the channel distortion. Therefore, the allocation of the bits among the source, the FEC, and the ARQ for a given fixed bandwidth capacity are focused upon so as to achieve the minimal expected end-to-end distortion.

Suppose R(t) is the available bit rate at time t, $R_S(t)$, $R_{ARQ}(t)$, and $R_{FEC}(t)$ are the bit rates used for the source, the FEC, the ARQ at time t, respectively. Then the distortion-minimized resource allocation can be formulated as $$\min_{\{R_S, R_{ARQ}, R_{FEC}\}} D_{end-to-end} = D_S(R_S) + D_{ARQ}(R_{ARQ}) + D_{FEC}(R_{FEC}) \quad (29)$$

subject to $R_S(t) + R_{ARQ}(t) + R_{FEC}(t) \le R(t)$, where $D_S(R_s)$ is the source distortion caused by source coding rate $R_s$, $D_{ARQ}(R_{ARQ})$ and $D_{FEC}(R_{FEC})$ are the residual channel distortions caused by applying retransmission rate $R_{ARQ}$ and error protection rate $R_{FEC}$, respectively.

The bit rate of the source side is composed of bit rate in both the BL and ELs. Mathematically, $$R_s = R_{s\_base} + \sum_{i=1}^{L} R_{s\_enh}(i), \quad (30)$$

where L is the number of layers in ELs, and $R_{s\_base}$ and $R_{s\_enh}$ represent the source rates of the BL and of ELs, respectively.

Source distortion is composed of distortion in both the BL and ELs, which can be described as $$D_s(R_s) = D_s(R_{s\_base}) + \sum_{i=1}^{L} D_s(R_{s\_enh}(i)). \quad (31)$$

Next, a discussion is had as to the specifics of the channel distortion. As discussed above, a hybrid delay-constrained ARQ and FEC for the BL are adopted to reduce the residual error, which works as follows. The sender determines the degree of protection for each transmission such that the expected end-to-end distortion is minimized while satisfying the QoS level requirement. Upon receiving the retransmission request for the corrupted packet, the source side will only transmit the necessary part of higher protection for the packet. Because only the protection code needs to be transmitted over the channel for re-transmission, the transmission overhead can be reduced. In one implementation, an RS (n, k) code is used for forward error correction, as mentioned before. Suppose n is fixed and let $$t_i = \left\lfloor \frac{n - k_i}{2} \right\rfloor$$

represent the protection level for the ith transmission. Then, the protection rate needed for the BL delivery is calculated as follows:

$$R_{ARQ} = \sum_{i=1}^{bn} R_{prot}(t_1, R_{s\_base}(i)) + \quad (32)$$

$$\sum_{j=2}^{N_{max}-1} \left\{ \sum_{i=1}^{bn} [P_{fail}(i, j-1) \times R_{prot}(t_J, R_{s\_base}(i))] \right\},$$

$$R_{prot}(t, R_{ss}) = \frac{2t}{n} \times R_{ss}, \quad (33)$$

$$P_{fail}(i, j) = \prod_{l=1}^{j} P_{fail,packet}(i, l), \text{ and} \quad (34)$$

$$P_{fail,packet}(i, j) = 1 - \sum_{x=0}^{t_j} \left\{ \sum_{y=0}^{x} \left[ \binom{n}{y} p_s(i)^y (1 - p_s(i))^{n-y} \right] \right\}, \quad (35)$$

where bn is the number of source packets needed to be transmitted, $R_{prot}(t, R_{ss})$ is the bit rate needed for protecting $R_{ss}$ at level t, $P_{fail}(i, j)$ is the probability of the $i^{th}$ packet failed in the past j times retransmission, $P_{fail,packet}(i, j)$ is the probability of the $i^{th}$ packet that is failed in the $j^{th}$ retransmission, and $p_s(i)$ is the probability of symbol failure of the $i^{th}$ packet.

After hybrid FEC and delay-constrained ARQ protection for BL, only those blocks that cannot be recovered will cause the additional channel distortion. Thus, the channel distortion of the BL can be described as $$D(R_{ARQ}) = \sum_{i=0}^{bn} [P_{fail}(i, N_{max} - 1) \times D_c(i)], \quad (36)$$

where $D_c(i)$ is the channel distortion caused by the loss of packet i.

Now an analysis is made of the channel distortion in ELs. Considering the dependency among layers, UEP is applied for the ELs. Similar to the BL, use $$t_i = \left\lfloor \frac{n - k_i}{2} \right\rfloor$$

to represent the protection level for the $i^{th}$ layer. The protection rate needed for the ELs delivery is then represented as follows:

$$R_{FEC} = \sum_{i=1}^{L} R_{prot}(t_i, R_{s\_enh}(i)), \quad (37)$$

where L is the number of layers needed to be transmitted, and $R_{prot}(t, R_{ss})$ is the bit rate needed for protecting $R_{ss}$ at level t, which had been defined in (33). Then, the channel distortion of ELs after UEP can be expressed as:

$$D(R_{FEC}) = \sum_{i=1}^{L} \left[ \sum_{j=1}^{bn_1} (P_{fail,layer}(i, j) \times D_c(j)) \right], \quad (38)$$

$$P_{fail,layer}(i,j) = \qquad (39)$$
$$P_{fail,packet,layer}(i,j) \left[ \prod_{m=1}^{i-1} (1 - P_{fail,packet,layer}(m,j)) \right],$$

and $$P_{fail,packet,layer}(i,j) = 1 - \sum_{x=0}^{t_i} \left\{ \sum_{y=0}^{x} \left[ \binom{n}{y} p_s(j)^y (1-p_s(j))^{n-y} \right] \right\}, \qquad (40)$$

where $bn_1$ is the number of source packets needed to be transmitted in the $i^{th}$ layer, $P_{fail,layer}(i, j)$ is the probability that the $j^{th}$ packet in the $i^{th}$ layer is corrupted while the corresponding packets in the previous layers are correct, and $P_{fail,packet,layer}(i, j)$ is the probability that the $j^{th}$ packet is corrupted in the $i^{th}$ layer.

Substituting Eqs. (32, 36, 37, 38) into Eq. (29), the distortion-minimized resource allocation for scalable video delivery can be solved given the total available bit rate budget R(t) at time t.

Figure 20A:
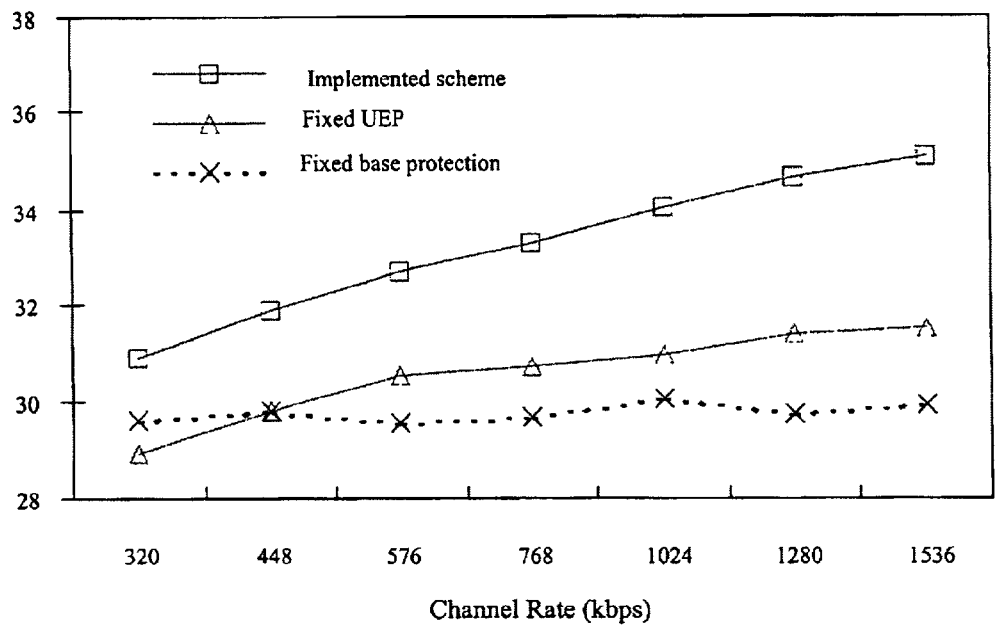
FIGS. 20a and 20b show the average peak signal to noise ratio (PSNR) for the MPEG-4 test sequence "Foreman" using three (3) tested schemes under different bit rates, where each of FIGS. 20a and 20b is a graph of PSNR vs. channel rate in kbps showing, respectively, high and low error channels.
Figure 20B:
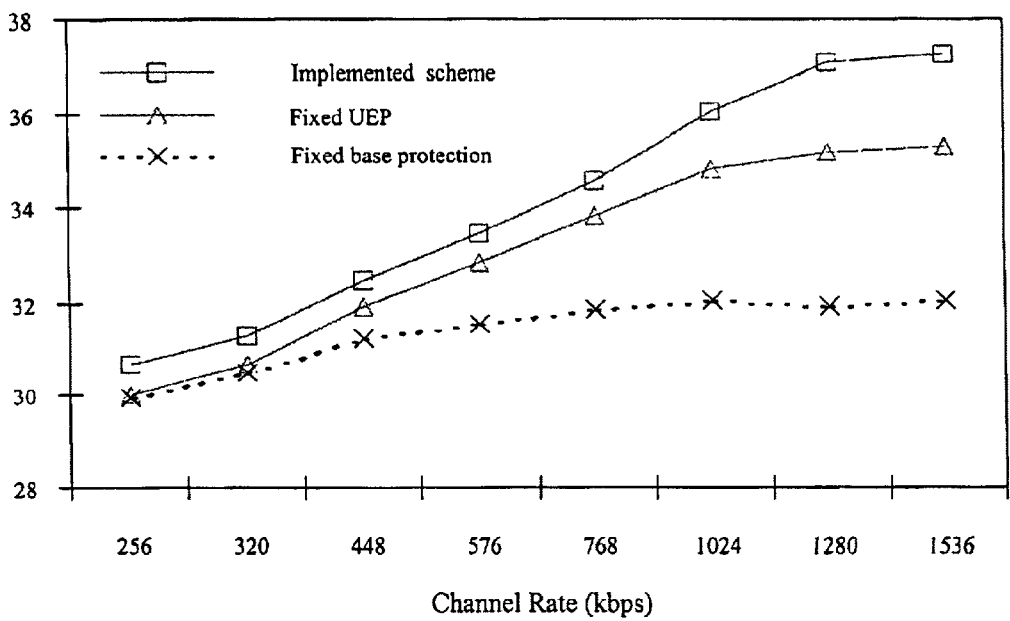

FIG. 20 depicts the corresponding rate-distortion relation of a hybrid UEP and delay-constrained ARQ scheme of one implementation. Based on the above analysis and from FIG. 20, it can be seen that $D_{min-ARQ} \leq D_{min} \leq D_{min-FEC}$. In the meantime, the delay bound of media ($T_{bound}$) is satisfied.

8.3 Power-Minimized Resource Allocation

Besides the channel bandwidth capacity, another highly limited resource in wireless networks is power, which includes the transmitter power and receiver power. In one implementation, consideration of the receiver power in the mobile devices is taken, which consists of receiving power, source decoding power and channel decoding power. It is observed that both the source and the channel have a tradeoff between the coding rate and the processing power consumption. Thus, the power-optimized resource allocation problem can be formulated as: given the fixed bandwidth capacity, how should the bits be allocated among the source, the FEC, and the ARQ so as to achieve the minimum power consumption under the desired end-to-end distortion range. Let R(t) represent the available bit rate at time t, $R_S(t)$, $R_{ARQ}(t)$, and $R_{FEC}(t)$ represent the bit rate used for the source, the FEC, the ARQ at time t, respectively, and D(t) represent the tolerable distortion at time t. Then, the power-minimized resource allocation can be described as:

$$\min_{\{R_S, R_{ARQ}, R_{FEC}\}} PC = PC_{rec,s}(R_s) + PC_{rec,ARQ}(R_{ARQ}) + \qquad (41)$$
$$PC_{rec,FEC}(R_{FEC}) + PC_s(R_s) + PC_{ARQ}(R_{ARQ}) + PC_{FEC}(R_{FEC})$$

subject to $$D_s(R_s) + D_{ARQ}(R_{ARQ}) + D_{FEC}(R_{FEC}) \leq D(t) \text{ and}$$
$$R_S(t) + R_{ARQ}(t) + R_{FEC}(t) \leq R(t),$$

where $PC_{rec,s}(R_s)$, $PC_{rec,ARQ}(R_{ARQ})$, and $PC_{rec,FEC}(R_{FEC})$ are the power consumed for receiving the source, the ARQ, and the FEC, respectively, and $PC_s(R_s)$, $PC_{ARQ}(R_{ARQ})$, $PC_{FEC}(R_{FEC})$ are consumed power for the source coding, the ARQ, and the FEC, respectively.

Source decoding and channel decoding have different power consumptions. For the source part, the receiving power is composed of receiving powers for both the BL and ELs. Mathematically, $$PC_{rec,s}(R_s) = \qquad (42)$$
$$\sum_{i=1}^{bn} [\rho_{rec} \times (R_{s\_base}(i))] + \sum_{j=1}^{L} \left\{ \sum_{i=1}^{bn_j} [\rho_{rec} \times (R_{s\_enh}(i,j))] \right\},$$

where $bn_j$ is the number of blocks in the $j^{th}$ layer, and $\rho_{rec}$ is the power consumed for per bit transmission. The consumed processing power for the source part is related to the source decoding rate, which is denoted as $$PC_s(R_s) = \rho s(R_s) = \sum_{i=1}^{bn} \rho s(R_{s\_base}(i)) + \sum_{j=1}^{L} \left\{ \sum_{i=1}^{bn_j} \rho s \times (R_{s\_enh}(i,j)) \right\}, \qquad (43)$$

where $\rho s(.)$ can be obtained from FIG. 15.

As for the channel part, the consumed processing power is related to both the source decoding rate and the channel protection rate, which is represented as $PC_{FEC}(R_s, R_{FEC}) = \rho c(R_s, R_{FEC}) = \rho c(R_s, t)$, where t is the error protection level, and $\rho c(.)$ can be obtained from FIG. 16.

In the hybrid delay-constrained ARQ and FEC scheme that used for the BL of one implementation, any corrupted packet is allowed to be transmitted, at the most, $N_{max}$ times. Once receiving the retransmission request, a higher protection level is determined by the sender to achieve the desired video quality. On the sender side, only the code that has the higher protection will be transmitted to the receiver. While on the receiver side, different channel decoding would be performed after each transmission. Thus, the receiving power consumption for the BL is formulated as:

$$PC_{rec,ARQ}(R_{ARQ}) = \sum_{i=1}^{bn} [\rho_{rec} \times R_{prot}(t_1, R_{s\_base}(i))] + \qquad (44)$$
$$\sum_{j=2}^{N_{max}-1} \left\{ \sum_{i=1}^{bn} [P_{fail}(i, j-1) \times \rho_{rec} \times R_{prot}(t_j, R_{s\_base}(i))] \right\},$$

where $t_i$ is the error protection level for the $i^{th}$ retransmission. Similarly, the processing power consumption for the BL is represented as $$PC_{ARQ}(R_{ARQ}) = \sum_{i=1}^{bn} \rho c \Bigg( R_{s\_base}(i), \qquad (45)$$
$$(t_1) + \sum_{j=2}^{N_{max}-1} \left\{ \sum_{i=1}^{bn} [P_{fail}(i, j-1) \times \rho c(R_{s\_base}(i), t_j)] \right\} \Bigg).$$

As discussed before, UEP is applied to ELs. To be specific, different channel protection bits will be transmitted for different layers on the sender side; while different channel decoding will be performed for different layers on the receiver side. The receiving power consumption for ELs is represented as:

$$PC_{rec,FEC}(R_{FEC}) = \sum_{j=1}^{L} \left\{ \sum_{i=1}^{bn_j} [p_{rec} \times R_{prot}(t_j, R_{s\_enh}(i, j))] \right\}. \quad (46)$$

Similarly, the processing power consumption for ELs is expressed as $$PC_{FEC}(R_{FEC}) = \sum_{j=1}^{L} \left\{ \sum_{i=1}^{bn_j} [pc(R_{s\_enh}(i, j), t_j)] \right\}. \quad (47)$$

Substituting Eqs. (42–47) into Eq. (41), the power-minimized resource allocation for scalable video delivery can be solved, given the total available bit rate budget R(t) at time t and the desired distortion range D(t) at time t. Note that optimization methods, such as Lagrange multiplier and penalty function methods, can be used to solve the constrained non-linear optimization problem.

9. Simulation Results

The simulations in this Section 9 demonstrate the effectiveness of various implementations of the channel-adaptive resource allocation scheme. The purpose of this simulation is to show that:

(1) Implementations of the distortion-optimized resource allocation approach can achieve the minimal distortion for PFGS delivery using an implementation of an unequal error protection (UEP) and delay-constrained ARQ error control scheme.

(2) Implementations of the power-optimized resource allocation approach can achieve significant power saving ratio within a tolerable distortion range for PFGS using the hybrid UEP and delay constrained ARQ error control scheme.

9.1 Simulation Environment

The performance of the resource allocation scheme is analyzed in a simulation environment with the parameters shown in Table 1. Two-path Rayleigh fading W-CDMA channel is used in the simulation to generate the error pattern. The Application Layer data is packetized and transported in UDP packet with the size of 576 bytes. The UDP packet is further segmented into several RLC frames with the frame size varies from 320 bits to 640 bits. The maximal number of retransmission times for a RLC frame is 3. The application available bit rate in the simulation varies from 256 Kbps to 1.5 Mbps, and the block error rate is divided into high error and low error cases.

TABLE 1

| Simulation Parameters | |
|---|---|
| Channel | Two-path Rayleigh fading |
| Multipath profile | ITU Outdoor-to-indoor A |
| Mobile speed | 3 km/h |
| UDP packet size | 576 Bytes |
| RLC-PDU (includes CRC) | 320 bits, 640 bits |
| CRC bits | 16 |
| Maximal RLC retransmission times | 3 |
| TTI | 10 ms, 20 ms, 40 ms, 80 ms |
| Channel coding | RS (245, 200), (225, 180) Convolutional coding: 1/3, 2/3 |
| Pilot/TPC/TFI bits per slot | 6/2/2 |
| Channel estimation | Present slot and 7 previous slots interpolated |
| Simulation length | 80s |

TABLE 1-continued

| Simulation Parameters | |
|---|---|
| BLER target | Low error case: 8e−4 to 5e−3 |
| | High error case: 5e−3 to 2e−2 |
| Application available bit rate | 256 Kbps to 1.5 Mbps |

9.2 Performance Of Distortion-Minimized Resource Allocation

In this simulation, tests were made of:

(1) An implementation of the channel-adaptive distortion-optimized resource allocation scheme for hybrid UEP and delay-constrained ARQ;

(2) PFGS with UEP, which used fixed channel protection for each priority (25% protection for base layer, 10% protection for enhance layer); and (3) PFGS with fixed channel protection in base layer (25% protection).

In all the cases, the first frame was intra-coded, and the remaining frames were inter-coded. The testing video sequence is in the MPEG-4 test sequence "Foreman", that is coded in CIF at a temporal resolution of 10 fps. There were conducted simulations under the channel bandwidth varying from 256 kbps to 1.5 Mbps. To demonstrate the effectiveness of the implementations, the simulations were performed in both high error and low error cases. Note that in all these simulations the total rates including source and channel are the same for all the cases.

In this simulation, the channel rate is obtained by analyzing the application throughput; while the channel condition is obtained by the report from the Physical Layer. Given the channel rate and the channel condition, there was first added a strong protection to the base layer so that the residual error probability in the BL is lower than $10^{-5}$. Then the optimal FEC rate and the source rate were found, followed by adding error protection to each enhance layer. Note that in the simulation of the hybrid delay-constrained ARQ and UEP scheme, only one re-transmission in the Application Layer is performed.

Figure 21A:
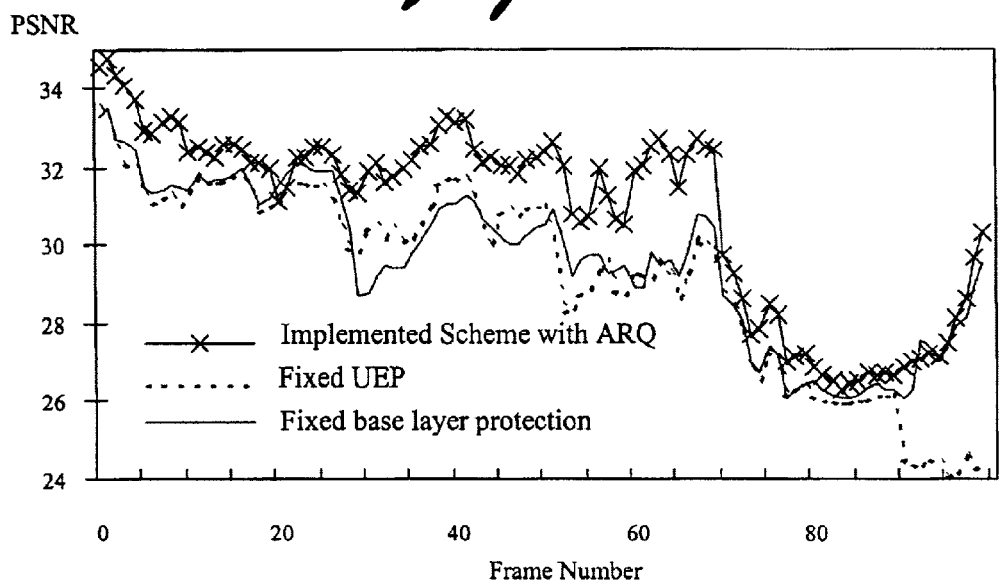
FIGS. 21a and 21b show the average peak signal to noise ratio (PSNR) for the MPEG-4 test sequence "Foreman" using the three (3) tested schemes of FIGS. 20a–20b at 320 kbps, where each of FIGS. 21a and 21b is a graph of PSNR vs. frame number, respectively, for the high and low error case.
Figure 21B:
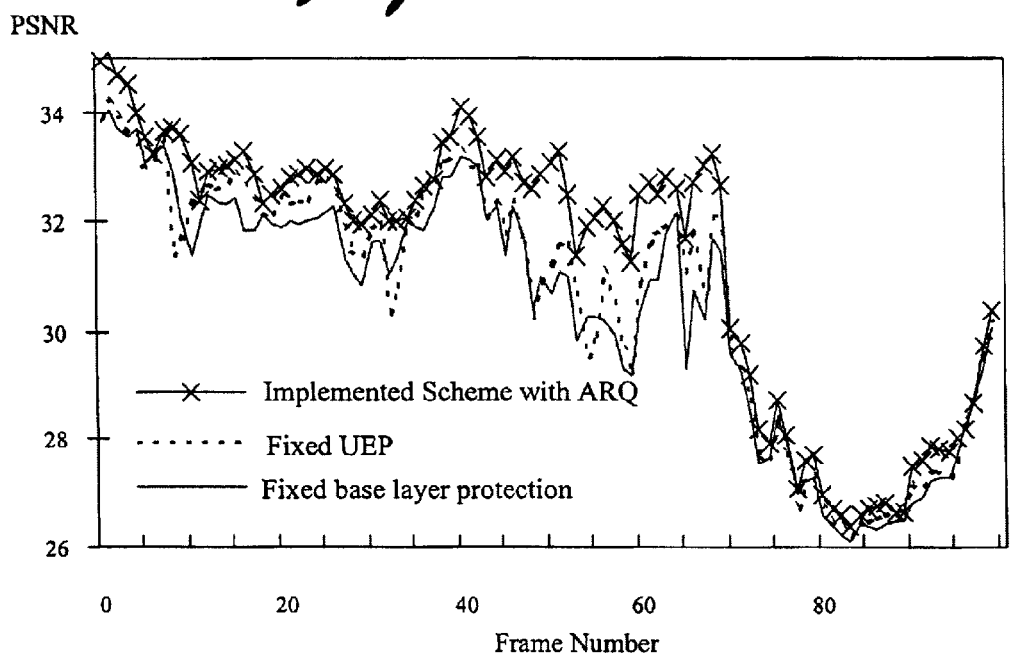

FIGS. 21a and 21b show that Average Peak Signal To Noise Ratio (PSNR) for the MPEG-4 test sequence "Foreman" using the three tested schemes under different bit rates. These figures also show the measured average PSNR and distortion at different channel rates under high-error channels (FIG. 21a) and low-error channels (FIG. 21b). It can be seen that the implemented scheme achieves the best performance among different channel conditions and various channel rates. Notice that the higher channel rate, the larger difference between the implemented scheme and the other two fixed UEP schemes. It can also be seen that from FIGS. 14a–14b, the PSNR that is obtained using the other two schemes increases slower than the implemented scheme. This is because the target bits are allocated according to the quality impact of each layer in the implemented approach. It can be further observed that the PSNR increases as the channel rate increases. The speed of the increase slows down as the information added becomes less important.

Tables 2a and 2b shows simulation results for the MPEG-4 test sequence "Foreman" for high and low channel error, respectively. Tabular comparison results are seen in Tables 2a and 2b of the average PSNR for the whole sequence and average protection ratio used in the implemented channel-adaptive resource allocation scheme and the other two schemes. Note that the total available bandwidth is the same in all the cases.

TABLE 2a

Simulation results for the MPEG-4 test sequence "Foreman": High error channel

| Channel | Our Scheme | | Fixed UEP | | Fixed Base Protection | |
|---|---|---|---|---|---|---|
| Bandwidth (Kbps) | Average PSNR (dB) | Average Protection Ratio (%) | Average PSNR (dB) | Average Protection Ratio (%) | Average PSNR (dB) | Average Protection Ratio (%) |
| 320 | 30.91 | 16.6 | 28.95 | 18.8 | 29.63 | 14.2 |
| 448 | 31.88 | 19.6 | 29.81 | 16.2 | 29.81 | 10.1 |
| 576 | 32.72 | 21.0 | 30.54 | 14.8 | 29.57 | 7.9 |
| 768 | 33.33 | 19.4 | 30.71 | 13.6 | 29.68 | 5.9 |
| 1024 | 34.06 | 19.2 | 30.97 | 12.7 | 30.02 | 4.4 |
| 1280 | 34.66 | 19.2 | 31.37 | 12.2 | 29.73 | 3.6 |
| 1536 | 35.07 | 26.1 | 31.51 | 11.9 | 29.92 | 3.0 |

TABLE 2

Simulation results for the MPEG-4 test sequence "Foreman": Low error channel

| Channel | Implemented Scheme | | Fixed UEP | | Fixed Base Protection | |
|---|---|---|---|---|---|---|
| Bandwidth (Kbps) | Average PSNR (dB) | Average Protection Ratio (%) | Average PSNR (dB) | Average Protection Ratio (%) | Average PSNR (dB) | Average Protection Ratio (%) |
| 256 | 30.71 | 7.6 | 30.04 | 20.8 | 29.99 | 17.7 |
| 320 | 31.34 | 8.2 | 30.71 | 18.8 | 30.50 | 14.2 |
| 448 | 32.47 | 11.6 | 31.93 | 16.2 | 31.24 | 10.1 |
| 576 | 33.44 | 12.4 | 32.87 | 14.8 | 31.57 | 7.9 |
| 768 | 34.57 | 12.9 | 33.83 | 13.6 | 31.85 | 5.9 |
| 1024 | 36.05 | 15.1 | 34.79 | 12.7 | 32.03 | 4.4 |
| 1280 | 37.07 | 16.5 | 35.16 | 12.2 | 31.92 | 3.6 |
| 1536 | 37.26 | 24.6 | 35.28 | 11.9 | 32.05 | 3.0 |

Figure 22A:
FIGS. 22a–22b show video frames from the MPEG-4 test sequence "Foreman" using the three (3) tested schemes of FIGS. 20a–20b in a comparison of the reconstructed 44$^{th}$ frame and the 50$^{th}$ frame of the sequence.
Figure 22B:
Figure 22C:
Figure 22D:
Figure 22E:
Figure 22F:
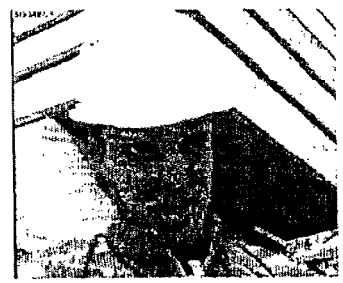

FIGS. 22a and 22b graphically presents PSNR comparison results for the MPEG-4 test sequence "Foreman" at 320 kbps channel rate using the implemented approach and two fixed UEP schemes for high and low error cases, respectively. From the graphs seen in FIGS. 22a–22b, it can be seen that the video quality obtained using the implemented approach is higher than the ones with other two schemes. Meanwhile, the video quality changes more smoothly in the implemented scheme.

Figure 23A:
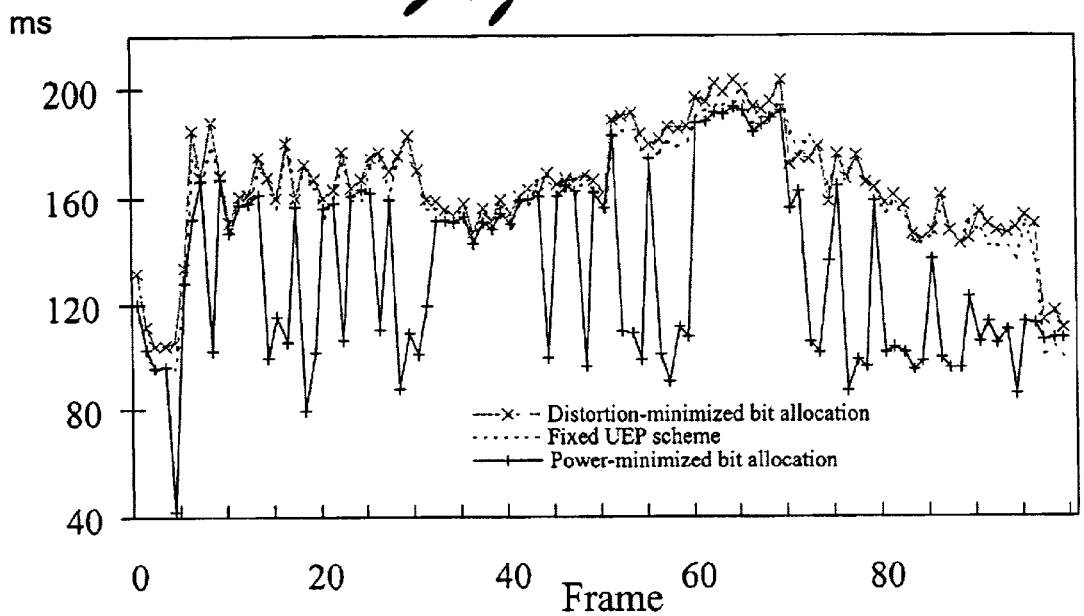
FIGS. 23a and 23b show a comparison of the results using the three (3) tested schemes of FIGS. 20a–20 at 256 kbps in the high error case.
Figure 23B:
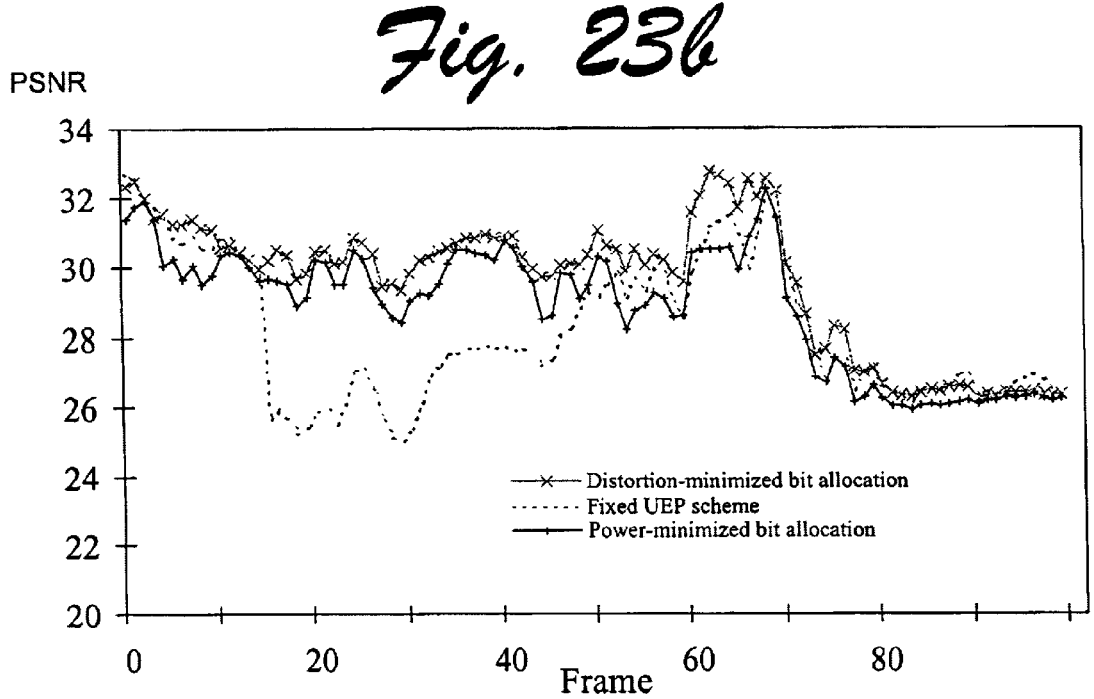

FIGS. 23a–f show comparisons of the reconstructed 44$^{th}$ video frame (FIGS. 23a–23c and 50$^{th}$ video frame (23d–23f) of the MPEG-4 test sequence "Foreman". The images on the left (23a, 23d) are reconstructed by the implemented resource allocation scheme, those in the middle (23b, 23e) are reconstructed using fixed protection only for the base layer, and those on the right (23c, 23f) are obtained by UEP scheme. FIGS. 23a–f show comparison of the reconstructed frames using the implemented approach and the other two schemes. Therein, FIG. 23a is the reconstructed 44$^{th}$ frame using the implemented resource allocation scheme, FIG. 23b is the reconstructed 44$^{th}$ frame using fixed protection only for base layer, and FIG. 23c shows the reconstructed 44$^{th}$ frame using fixed UEP scheme. FIG. 23d is the reconstructed 50$^{th}$ frame using the implemented resource allocation scheme, FIG. 23e is the reconstructed 50$^{th}$ frame using fixed protection only for base layer, and FIG. 23f shows the reconstructed 50$^{th}$ frame using fixed UEP scheme.

From FIGS. 21a–23f and Table 2, it can be seen that the implemented channel-adaptive distortion-minimized resource allocation scheme obtains better results than the fixed UEP and fixed base-layer protection scheme under fading channel condition with different error rates, both subjectively and objectively.

9.3 Performance Of Power-Minimized Resource Allocation

The simulation was to demonstrate the effectiveness of the implemented power-optimized resource allocation scheme for PFGS. In this simulation tests were made of:

(1) the implemented channel-adaptive power-minimized resource allocation scheme with hybrid UEP and delay-constrained ARQ;

(2) the implemented channel-adaptive distortion-minimized resource allocation scheme with hybrid UEP and delay-constrained ARQ;

(3) PFGS with UEP, which used fixed channel protection for each priority (25% protection for base layer, 10% protection for enhance layer). In the implemented power-minimized resource allocation case, various ranges of tolerable distortion are tested.

Again, the MPEG-4 test sequence "Foreman" was coded in CIF at a temporal resolution of 10 fps. The first frame was intra-coded and the remaining frames were inter-coded. Simulations were conducted under the channel bandwidth varying from 256 kbps to 1 Mbps. To demonstrate the effective of the implemented scheme, the simulations were performed in both high error and low error cases. Since the receiving power is relatively small comparing with the source and channel processing power as stated above, calculations were made of the source and channel processing power in the simulation.

TABLE 3

Comparison results for the MPEG-4 test sequence "Foreman" in the high error case

| | 256 kbps | | | | 320 kbps | | | |
|---|---|---|---|---|---|---|---|---|
| Schemes | PSNR (dB) | Quality Reduction Ratio (%) | Time (ms) | Power Saving Ratio (%) | PSNR (dB) | Quality Reduction Ratio (%) | Time (ms) | Power Saving Ratio (%) |
| 1 | 29.59 | 0 | 164.11 | 0 | 30.26 | 0 | 172.88 | 0 |
| 2 | 28.13 | 4.92 | 160.07 | 2.47 | 28.44 | 6 | 165.90 | 4.04 |
| 3 | 29.47 | 0.43 | 157.41 | 4.08 | 30.06 | 0.67 | 167.66 | 3.02 |
| 4 | 29.33 | 0.91 | 155.35 | 5.33 | 29.91 | 1.17 | 165.41 | 4.32 |
| 5 | 29.09 | 1.72 | 145.51 | 11.33 | 29.56 | 2.33 | 161.49 | 6.59 |
| 6 | 28.88 | 2.42 | 132.32 | 19.37 | 29.32 | 3.12 | 152.28 | 11.91 |

Table 3 tabulates the comparison results of the average computational time (representing the power consumption) and the PSNR for the whole sequence for these three schemes in high error case. Scheme 1 of Table 3 uses the optimal resource allocation scheme without considering power consumption. It needs the longest computational time while achieving the highest PSNR. Scheme 1 of Table 3 was used as the comparison criteria. Scheme 2 uses the fixed UEP. As mentioned above, different a desired distortion tolerance range may have different impacts on video quality and power consumption. Schemes 3, 4, 5, 6 of Table 3 use the power-minimized resource allocation scheme with the desired distortion increment range 10%, 20%, 40%, 60%, respectively.

Figure 24A:
FIGS. 24a and 24b show a comparison of the reconstructed 36$^{th}$ frame of the MPEG-4 test sequence "Foreman" in the high error case.
Figure 24B:
Figure 24C:
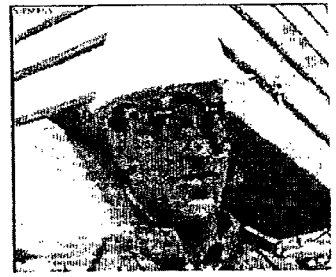
Figure 25A:
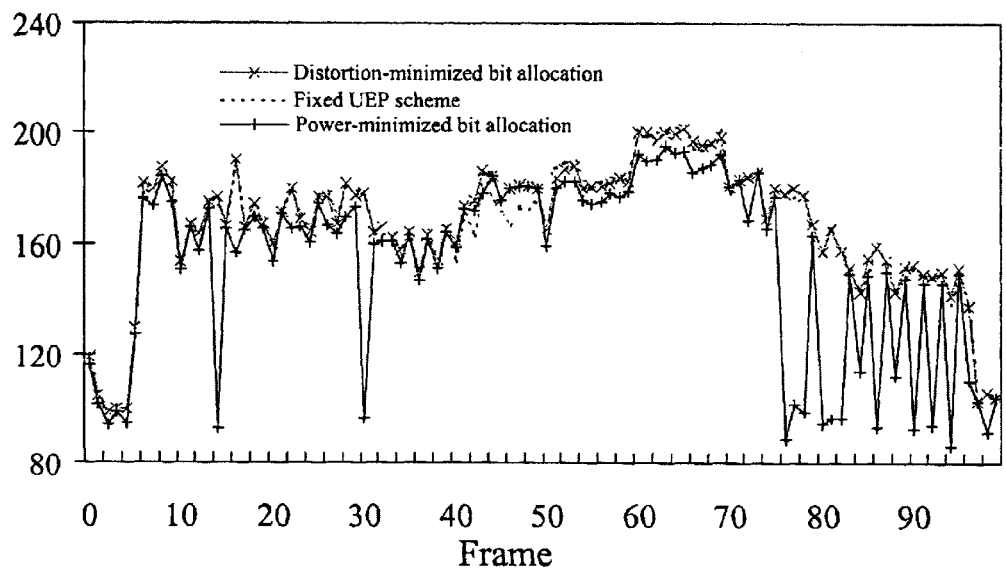
FIGS. 25a–25b show a comparison of the results of the MPEG-4 test sequence "Foreman " using the three (3) tested schemes of FIGS. 20a–20b at 320 kbps under the low error case, where
Figure 25B:
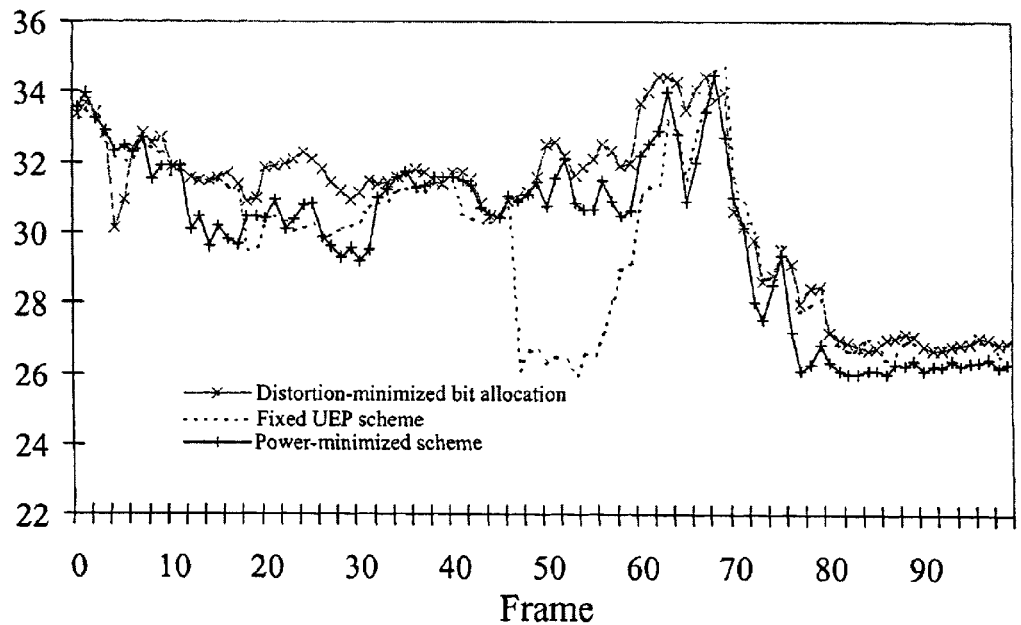

FIGS. 24a and 24b show comparison results for the MPEG-4 test sequence "Foreman " at 256 kbps available bandwidth in the high error case. It can be seen from FIGS. 24a–24b that the implemented scheme requires less computational time than the other schemes almost in every frame. In the meanwhile, the PSNR obtained in the implemented scheme is a little less than the one in the optimal resource allocation scheme while it is higher than the one in the fixed UEP scheme. Note that those performances vary within the various tolerable distortion ranges. In FIGS. 25a and 25b, the desired distortion increment range is 60%.

FIGS. 25a and 25b show comparisons of the reconstructed frames using the implemented approach and the other two schemes at 256 kbps in the high error case. FIG. 18a is a video sequence that is the reconstructed $36^{th}$ frame using the implemented power-minimized resource allocation scheme, FIG. 18b is the reconstructed $36^{th}$ frame using the implemented distortion-minimized resource allocation scheme, and FIG. 18c shows the reconstructed $36^{th}$ frame using fixed UEP scheme. It can be seen from FIGS. 18a–18cc that the image quality obtained by power-minimized resource allocation scheme is quite similar to the one obtained by distortion-minimized resource allocation scheme, but better than the one obtained by the fixed UEP scheme.

Table 4 tabulates comparison results of average computational time and PSNR for the whole sequence in these three schemes of FIGS. 25a–25c in low error case. Schemes 1-6 are the same as in the high error case.

Figure 26A:
FIGS. 26a–26c show the reconstructed 42$^{nd}$ video frame from the MPEG-4 test sequence "Foreman" in the low error case.
Figure 26B:
Figure 26C:

FIGS. 26a and 26b show the comparison results for the MPEG-4 test sequence "Foreman" at 320 kbps available bandwidth in the low-error case. It can be seen that the implemented scheme requires less computational time than the other schemes almost in every frame. In the meantime, the PSNR obtained in the implemented scheme is a little less than the one in the optimal resource allocation scheme but higher than the one in the fixed UEP scheme. Note that those performances vary within the various tolerable distortion ranges. In FIGS. 26a and 26b, the desired distortion increment range is 60%.

FIGS. 27a–27c show comparisons of the reconstructed frames using the implemented approach and the other two schemes at 320 kbps in the low error case. FIG. 27a is the reconstructed $42^{nd}$ frame using the implemented power-minimized resource allocation scheme, FIG. 27b is the reconstructed $42^{nd}$ frame using the implemented distortion-minimized resource allocation scheme, and FIG. 27c shows the reconstructed $42^{nd}$ frame using fixed UEP scheme. It can be seen from FIGS. 27a–c that the image quality obtained by the implemented power-minimized resource allocation scheme is quite similar to that obtained by the implemented distortion-minimized resource allocation scheme, but better than the one obtained by the fixed UEP scheme.

From FIGS. 24a–27c and Tables 3–4, it can be seen that the implemented channel-adaptive power- minimized resource allocation scheme obtains better results than the fixed UEP scheme in different error cases, both subjectively and objectively. As such, the implemented scheme can achieve significant power saving ratio within a tolerable distortion range.

In summary, the simulation results presented in this Section 9 show that:

(1) The implemented distortion-minimized resource allocation scheme with hybrid UEP and delay-constrained ARQ can achieve the minimal distortion for PFGS; and (2) The implemented power-minimized resource allocation with hybrid UEP and delay-constrained ARQ can achieve significant power saving ratio within a tolerable distortion range.

Figure 8:
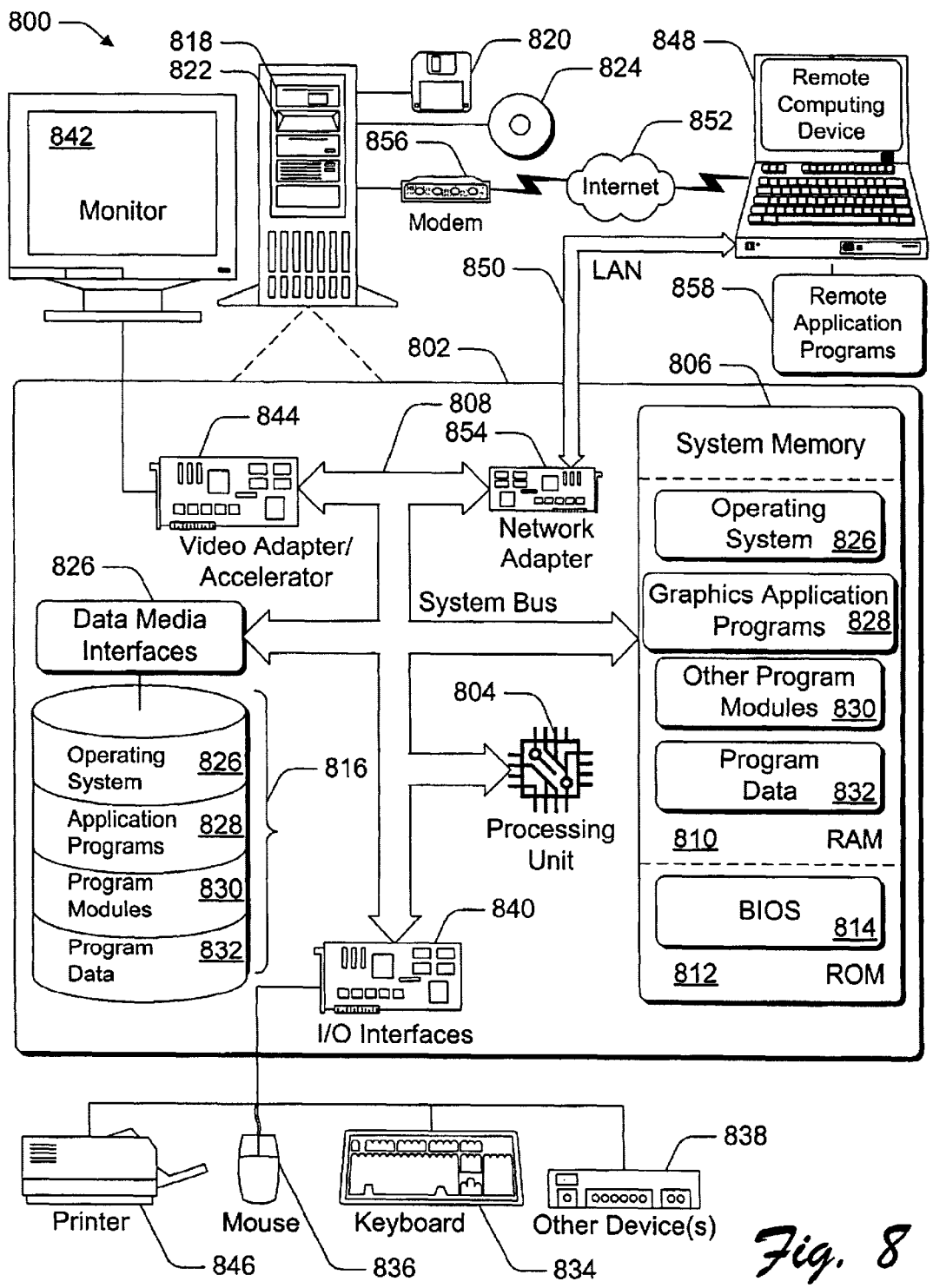
FIG. 8 is an example of a computing operating environment capable of implementing, either wholly or partially, an illustrative implementation of the invention.

The inventors intend these exemplary implementations to be examples and not to limit the scope of the present invention. Rather, the inventors have contemplated that the present invention might also be embodied and implemented in other ways, in conjunction with other present or future technologies 10. Exemplary Computing System and Environment FIG. 8 illustrates an example of a suitable computing environment 800 within which the Channel and QoS Level Adaptive Scheme for Multimedia Delivery over W-CDMA,

TABLE 4

Comparison results for the MPEG-4 test sequence "Foreman" in the low-error case

| | 256 kbps | | | | 320 kbps | | | |
|---|---|---|---|---|---|---|---|---|
| Schemes | PSNR (dB) | Quality Reduction Ratio (%) | Time (ms) | Power Saving Ratio (%) | PSNR (dB) | Quality Reduction Ratio (%) | Time (ms) | Power Saving Ratio (%) |
| 1 | 30.06 | 0 | 159.39 | 0 | 30.79 | 0 | 166.69 | 0 |
| 2 | 29.32 | 2.47 | 158.79 | 0.38 | 29.69 | 3.55 | 165.66 | 0.62 |
| 3 | 29.95 | 0.39 | 156.48 | 1.83 | 30.72 | 0.23 | 164.83 | 1.12 |
| 4 | 29.83 | 0.8 | 154.66 | 3.0 | 30.65 | 0.44 | 161.14 | 3.33 |
| 5 | 29.69 | 1.24 | 148.40 | 6.90 | 30.43 | 1.17 | 159.70 | 4.19 |
| 6 | 29.18 | 2.95 | 139.07 | 12.75 | 29.96 | 2.69 | 153.38 | 7.99 | as described herein, may be implemented (either fully or partially). The computing environment 800 may be utilized in the computer and network architectures described herein.

The exemplary computing environment 800 is only one example of a computing environment and is not intended to suggest any limitation as to the scope of use or functionality of the computer and network architectures. Neither should the computing environment 800 be interpreted as having any dependency or requirement relating to any one or combination of components illustrated in the exemplary computing environment 800.

Channel and QoS Level Adaptive Scheme for Multimedia Delivery over W-CDMA may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Channel and QoS Level Adaptive Scheme for Multimedia Delivery over W-CDMA may be described in the general context of computer-executable instructions, such as program modules, being executed by a computer. Generally, program modules include routines, programs, objects, components, data structures, etc. that perform particular tasks or implement particular abstract data types. Channel and QoS Level Adaptive Scheme for Multimedia Delivery over W-CDMA may also be practiced in distributed computing environments where tasks are performed by remote processing devices that are linked through a communications network. In a distributed computing environment, program modules may be located in both local and remote computer storage media including memory storage devices.

The computing environment 800 includes a general-purpose computing device in the form of a computer 802. The components of computer 802 can include, by are not limited to, one or more processors or processing units 804, a system memory 806, and a system bus 808 that couples various system components including the processor 804 to the system memory 806.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 802 typically includes a variety of computer readable media. Such media can be any available media that is accessible by computer 802 and includes both volatile and non-volatile media, removable and non-removable media.

The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804. System memory 806 is an example of a means for storing data having inputs and outputs and a frame buffer for storing pixel representations from which to render a three-dimensional graphical object.

Computer 802 may also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 826. Alternatively, the hard disk drive 816, magnetic disk drive 818, and optical disk drive 822 can be connected to the system bus 808 by one or more interfaces (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more graphics application programs 828, other program modules 830, and program data 832. Each of such operating system 826, one or more graphics application programs 828, other program modules 830, and program data 832 (or some combination thereof) may include an embodiment of program code to perform Channel and QoS Level Adaptive Scheme for Multimedia Delivery over W-CDMA.

A user can enter commands and information into computer 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter/accelerator 844. Video adapter/accelerator 844 is intended to have a component thereof that represents 3-D commodity graphics hardware. As such, the 3-D commodity graphics hardware is coupled to the high-speed system bus 806. The 3-D commodity graphics hardware may be coupled to the system bus 808 by, for example, a cross bar switch or other bus connectivity logic. It is assumed that various other peripheral devices, or other buses, may be connected to the high-speed system bus 808, as is well known in the art. Further, the 3-D commodity graphics hardware may be coupled through one or more other buses to system bus 808.

In addition to the monitor 842, other output peripheral devices can include components such as speakers (not shown) and a printer 846 which can be connected to computer 802 via the input/output interfaces 840.

Computer 802 can operate in a networked environment using logical connections to one or more remote computers, such as a remote computing device 848. By way of example, the remote computing device 848 can be a personal computer, portable computer, a server, a router, a network computer, a peer device or other common network node, and the like.

The remote computing device 848 is illustrated as a portable computer that can include many or all of the elements and features described herein relative to computer 802. Logical connections between computer 802 and the remote computer 848 are depicted as a local area network (LAN) 850 and a general wide area network (WAN) 852. Such networking environments are commonplace in offices, enterprise-wide computer networks, intranets, and the Internet.

When implemented in a LAN networking environment, the computer 802 is connected to a local network 850 via a network interface or adapter 854. When implemented in a WAN networking environment, the computer 802 typically includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components such as the operating system are illustrated herein as discrete blocks, although it is recognized that such programs and components reside at various times in different storage components of the computing device 802, and are executed by the data processor(s) of the computer.

Computer-Executable Instructions

An implementation of Channel and QoS Level Adaptive Scheme for Multimedia Delivery over W-CDMA may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 8 illustrates an example of a suitable operating environment 800 in which an exemplary Channel and QoS Level Adaptive Scheme for Multimedia Delivery over W-CDMA may be implemented. Specifically, the exemplary Channel and QoS Level Adaptive Scheme for Multimedia Delivery over W-CDMA described herein may be implemented (wholly or in part) by any program modules 828–830 and/or operating system 826 in FIG. 8 or a portion thereof.

The operating environment is only an example of a suitable operating environment and is not intended to suggest any limitation as to the scope or use of functionality of the exemplary Channel and QoS Level Adaptive Scheme for Multimedia Delivery over W-CDMA described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary Channel and QoS Level Adaptive Scheme for Multimedia Delivery over W-CDMA may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

For purposes of the explanation, specific numbers, materials and configurations are set forth above in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, and thereby better explain the present invention. Furthermore, for ease of understanding, certain method operations are delineated as separate operations; however, these separately delineated operations should not be construed as necessarily order dependent in their performance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

APPENDIX

FIG. 21a: Peak Signal To Noise Ratio (PSNR) vs. Channel Rate (kbps):

|  | 320 | 448 | 576 | 768 | 1024 | 1280 | 1536 |
|---|---|---|---|---|---|---|---|
| Implement scheme: | 30.91 | 31.88 | 32.72 | 33.33 | 34.06 | 34.66 | 35.07 |
| Fixed UEP: | 28.95 | 29.81 | 30.54 | 30.71 | 30.97 | 31.37 | 31.51 |
| Fixed base protection: | 29.63 | 29.81 | 29.57 | 29.68 | 30.02 | 29.73 | 29.92 |

FIG. 21b: Peak Signal To Noise Ratio (PSNR) vs. Channel Rate (kbps):

|  | 256 | 320 | 448 | 576 | 768 | 1024 | 1280 | 1536 |
|---|---|---|---|---|---|---|---|---|
| Implement scheme: | 30.71 | 31.34 | 32.47 | 33.44 | 34.57 | 36.05 | 37.07 | 37.26 |
| Fixed UEP: | 30.04 | 30.71 | 31.93 | 32.87 | 33.83 | 34.79 | 35.156 | 35.28 |
| Fixed base protection: | 29.99 | 30.5 | 31.24 | 31.57 | 31.85 | 32.03 | 31.92 | 32.05 |

FIG. 22a: Peak Signal To Noise Ratio (PSNR) for 100 Frames

Implementation scheme with ARQ

| | | | | |
|---|---|---|---|---|
| 34.584064 | 34.815634 | 34.344908 | 34.100972 | 33.758754 |
| 32.978592 | 32.890178 | 33.20582 | 33.298668 | 33.167785 |
| 32.412051 | 32.518231 | 32.439534 | 32.278182 | 32.648309 |
| 32.616226 | 32.502125 | 32.134657 | 32.09542 | 31.977119 |
| 31.15211 | 31.467163 | 32.25547 | 32.233202 | 32.569298 |
| 32.52232 | 32.368633 | 31.856035 | 31.413679 | 31.333274 |
| 31.893364 | 32.102961 | 31.621019 | 31.800835 | 31.996096 |
| 32.181731 | 32.530733 | 32.637176 | 33.076393 | 33.289795 |
| 33.208431 | 33.230925 | 32.451307 | 32.113184 | 32.281769 |
| 32.078777 | 32.036618 | 31.836756 | 32.181525 | 32.280067 |
| 32.406393 | 32.714067 | 32.047437 | 30.786783 | 30.590401 |
| 30.741063 | 31.962628 | 31.281068 | 30.672066 | 30.524995 |
| 31.944698 | 32.062382 | 32.566246 | 32.724144 | 32.317652 |
| 31.462232 | 32.339913 | 32.733208 | 32.581152 | 32.457355 |
| 29.734556 | 29.266855 | 28.637988 | 27.729666 | 27.85359 |
| 28.481684 | 28.201797 | 27.009832 | 27.170984 | 27.229765 |
| 26.892364 | 26.694874 | 26.50844 | 26.326214 | 26.462474 |
| 26.498556 | 26.699264 | 26.692219 | 26.741758 | 26.640257 |
| 26.883102 | 27.039486 | 27.10895 | 27.190464 | 27.167556 |
| 27.514204 | 28.155396 | 28.611868 | 29.707674 | 30.321413 |

Fixed UEP

| | | | | |
|---|---|---|---|---|
| 33.555906 | 33.273229 | 32.570944 | 32.138 | 31.998353 |
| 31.362105 | 31.061719 | 31.208006 | 31.291784 | 31.031312 |
| 31.348725 | 31.774103 | 31.660492 | 31.621137 | 31.670136 |
| 31.85806 | 31.735288 | 31.460515 | 30.893641 | 31.030859 |
| 31.102195 | 31.539451 | 31.667298 | 31.609895 | 31.56764 |
| 31.537493 | 31.16093 | 30.467715 | 29.960103 | 29.78623 |
| 30.387632 | 30.498289 | 30.181181 | 30.415074 | 30.102668 |
| 30.160028 | 30.486056 | 31.035339 | 31.560521 | 31.70428 |
| 31.792452 | 31.680501 | 31.25544 | 30.420998 | 30.035175 |
| 30.791577 | 30.947541 | 30.739382 | 30.958631 | 31.009252 |
| 31.010833 | 30.132885 | 28.282037 | 28.332695 | 28.695135 |
| 28.804267 | 29.299764 | 29.603377 | 28.801373 | 28.686934 |
| 29.284962 | 29.284057 | 29.141708 | 29.544352 | 29.259647 |
| 28.633205 | 29.252366 | 30.116935 | 29.999031 | 29.682484 |
| 28.730133 | 28.396302 | 27.804316 | 26.805856 | 26.502193 |
| 27.289533 | 27.130036 | 26.155077 | 26.29087 | 26.409276 |
| 26.183439 | 26.039674 | 26.029993 | 25.937897 | 25.962496 |
| 26.061668 | 26.038562 | 26.140811 | 26.141756 | 26.191488 |
| 24.553248 | 24.399607 | 24.348149 | 24.591621 | 24.468334 |
| 24.083734 | 24.151303 | 24.603374 | 24.302976 | 24.385349 |

Fixed base layer protection

| | | | | |
|---|---|---|---|---|
| 33.344119 | 33.545962 | 32.782506 | 32.69721 | 32.489516 |
| 31.474603 | 31.33189 | 31.419603 | 31.538126 | 31.47558 |
| 31.440749 | 31.856797 | 31.623448 | 31.719015 | 31.699093 |
| 31.819789 | 31.965195 | 31.599255 | 31.106089 | 31.225893 |
| 31.594431 | 31.824474 | 32.0945 | 32.051565 | 31.938442 |
| 31.925364 | 31.913838 | 31.217097 | 30.420276 | 28.723341 |
| 28.738587 | 29.213046 | 29.46496 | 29.396602 | 29.423469 |
| 29.817092 | 30.106455 | 30.525032 | 30.938684 | 31.06587 |
| 31.081859 | 31.256357 | 31.123227 | 30.66014 | 30.425109 |
| 30.165031 | 30.050734 | 30.028231 | 30.237586 | 30.468449 |
| 30.535156 | 30.913904 | 29.991573 | 29.151249 | 29.594137 |
| 29.727547 | 29.750637 | 29.247924 | 29.351956 | 29.441211 |
| 28.938828 | 28.892434 | 29.849947 | 29.492811 | 29.595562 |
| 29.194191 | 29.734474 | 30.770862 | 30.760421 | 30.470054 |
| 28.697145 | 28.385275 | 28.09072 | 27.046915 | 26.722332 |
| 27.425918 | 27.158195 | 26.128872 | 26.301383 | 26.419655 |
| 26.492703 | 26.29796 | 26.199817 | 26.082412 | 26.068077 |
| 26.190762 | 26.394935 | 26.469158 | 26.293702 | 26.284625 |
| 26.127278 | 26.310634 | 27.545276 | 27.437447 | 26.981643 |
| 27.424395 | 27.951454 | 28.126335 | 28.990652 | 29.541242 |

FIG. 22b: Peak Signal To Noise Ratio (PSNR) for 100 Frames

Implementation scheme with ARQ

| | | | | |
|---|---|---|---|---|
| 34.94738 | 35.118324 | 34.675696 | 34.499966 | 33.96359 |
| 33.57903 | 33.23996 | 33.655929 | 33.726705 | 33.621245 |
| 33.093479 | 32.392199 | 32.911398 | 32.963432 | 33.005142 |
| 33.155236 | 33.298492 | 32.86871 | 32.3511 | 32.499024 |
| 32.588178 | 32.803967 | 32.884544 | 32.961091 | 32.867528 |
| 32.972367 | 32.878631 | 32.311203 | 32.00821 | 31.95067 |
| 32.134544 | 32.366693 | 32.013631 | 32.034769 | 32.074622 |
| 32.415137 | 32.682418 | 32.786939 | 33.442895 | 33.585781 |
| 34.119991 | 33.93889 | 33.571384 | 32.808901 | 33.161422 |
| 32.939919 | 33.190275 | 32.703196 | 32.594894 | 32.86225 |
| 33.107466 | 33.286899 | 32.47043 | 31.383163 | 31.916692 |
| 32.059049 | 32.283232 | 32.011069 | 31.581078 | 31.260409 |
| 32.503928 | 32.701151 | 32.491308 | 32.834499 | 32.62734 |
| 31.708479 | 32.72365 | 33.04559 | 33.21816 | 32.680315 |
| 30.071966 | 29.75507 | 29.206991 | 28.194102 | 27.903236 |
| 28.707771 | 28.095846 | 27.04945 | 27.595877 | 27.705015 |
| 26.943955 | 26.710923 | 26.561441 | 26.39105 | 26.599079 |
| 26.685031 | 26.734076 | 26.814223 | 26.644283 | 26.636092 |
| 27.492871 | 27.619797 | 27.848451 | 27.819675 | 27.731827 |
| 28.040614 | 28.16432 | 28.649148 | 29.739188 | 30.345168 |

Fixed UEP

| | | | | |
|---|---|---|---|---|
| 33.863438 | 34.19123 | 33.947459 | 33.732277 | 33.607062 |
| 33.044902 | 33.122538 | 33.493217 | 31.379998 | 31.678521 |
| 32.363539 | 32.551302 | 32.694083 | 32.624157 | 32.717486 |
| 32.847482 | 32.642646 | 32.373084 | 32.188786 | 32.137878 |
| 32.507368 | 32.340494 | 32.416993 | 32.387634 | 32.773815 |
| 32.780278 | 32.526606 | 31.931172 | 31.502642 | 31.365607 |
| 31.893116 | 31.94363 | 30.321111 | 30.871087 | 32.045844 |
| 32.110872 | 32.54428 | 32.705712 | 33.150052 | 33.124404 |
| 33.286775 | 33.027588 | 33.038225 | 32.0603132 | 32.350766 |
| 31.815435 | 32.369133 | 31.59256 | 30.28508 | 30.903158 |
| 31.201425 | 31.628095 | 31.568158 | 30.709361 | 29.540406 |
| 29.915918 | 31.128693 | 30.543815 | 29.64829 | 29.250653 |
| 30.910278 | 31.5912 | 31.829503 | 31.937259 | 32.056242 |
| 31.098834 | 31.822028 | 30.476655 | 32.143741 | 32.111077 |
| 29.598381 | 29.246677 | 28.697059 | 27.697511 | 27.664699 |
| 28.384527 | 27.692169 | 26.70693 | 27.247538 | 27.336703 |
| 26.756743 | 26.485184 | 26.361196 | 26.185787 | 26.436549 |
| 26.479201 | 26.540426 | 26.609321 | 26.627437 | 26.585036 |
| 27.159435 | 27.144852 | 27.384315 | 27.414968 | 27.291819 |
| 27.615905 | 28.423048 | 28.8222 | 29.570588 | 30.163609 |

Fixed base layer protection

| | | | | |
|---|---|---|---|---|
| 33.841561 | 34.029631 | 33.722456 | 33.561577 | 33.719744 |
| 33.10316 | 33.165899 | 33.414431 | 32.944044 | 32.048277 |
| 31.369715 | 31.952138 | 32.51588 | 32.337277 | 32.314219 |
| 32.461397 | 31.871278 | 31.87605 | 32.134708 | 31.975074 |
| 31.892246 | 32.031635 | 31.9697 | 32.023494 | 32.074622 |
| 32.185298 | 32.305404 | 31.333946 | 31.033338 | 30.859751 |
| 31.630567 | 31.635496 | 31.073448 | 31.317212 | 32.007921 |
| 31.918262 | 31.879376 | 32.303759 | 32.833565 | 32.826792 |
| 33.20918 | 33.15297 | 33.045643 | 32.0644311 | 32.340806 |
| 31.367739 | 32.305709 | 31.718316 | 30.343813 | 31.028059 |
| 30.707037 | 31.119546 | 31.028964 | 29.840198 | 30.240703 |
| 30.267253 | 30.225992 | 29.941022 | 29.278866 | 29.209585 |
| 30.314278 | 30.956111 | 30.954478 | 31.82286 | 32.201106 |
| 29.287882 | 30.729095 | 30.222262 | 31.703495 | 31.435439 |
| 29.547973 | 29.259899 | 28.506516 | 27.542414 | 27.640978 |
| 28.390176 | 27.945866 | 26.933452 | 27.214612 | 27.2862 |
| 26.575424 | 26.386778 | 26.221845 | 26.108971 | 26.414219 |
| 26.366848 | 26.316556 | 26.436079 | 26.464688 | 26.478396 |

APPENDIX-continued

| | | | | |
|---|---|---|---|---|
| 26.808717 | 26.926549 | 27.221917 | 27.283201 | 27.2789 |
| 27.708813 | 28.29302 | 28.679896 | 29.339364 | 30.038188 |

FIG. 24a: ms for One Hundred (100) frames

Distortion-minimized bit allocation

| | | | | |
|---|---|---|---|---|
| 131.849747 | 111.328445 | 103.72612 | 104.190979 | 105.060471 |
| 133.66394 | 185.130112 | 168.022125 | 188.113617 | 168.324051 |
| 150.906586 | 160.983994 | 161.196396 | 175.173172 | 167.871323 |
| 159.964935 | 180.41362 | 159.796478 | 172.228424 | 167.264648 |
| 160.143112 | 163.432236 | 177.003845 | 164.248947 | 166.93631 |
| 175.445648 | 177.176865 | 170.082352 | 176.064896 | 182.974503 |
| 170.532806 | 159.376236 | 158.871246 | 155.15686 | 153.375061 |
| 157.951065 | 146.529572 | 155.753647 | 151.434982 | 159.016937 |
| 154.127914 | 160.88855 | 163.211365 | 161.679993 | 169.005096 |
| 165.231766 | 167.196075 | 166.467056 | 168.298828 | 166.440964 |
| 161.691772 | 189.245255 | 190.520157 | 191.976624 | 183.451157 |
| 179.553879 | 181.720657 | 186.563187 | 185.602585 | 186.409256 |
| 197.227997 | 195.439423 | 202.271301 | 198.792938 | 203.498352 |
| 200.270172 | 193.379837 | 192.804077 | 195.474243 | 203.207584 |
| 172.76973 | 175.244339 | 174.739822 | 179.199219 | 158.995682 |
| 176.445389 | 167.352753 | 175.675949 | 165.922607 | 163.846085 |
| 157.834198 | 161.126465 | 157.059738 | 145.918198 | 143.912918 |
| 147.242355 | 161.144913 | 147.667709 | 143.07106 | 144.551239 |
| 154.474564 | 149.849365 | 147.369781 | 147.10347 | 148.962585 |
| 153.398453 | 149.917023 | 113.805908 | 117.348 | 110.676155 |

Fixed UEP scheme

| | | | | |
|---|---|---|---|---|
| 117.748024 | 101.240181 | 94.827057 | 96.803688 | 95.117645 |
| 126.779793 | 176.270111 | 166.02832 | 178.424362 | 168.257721 |
| 146.921646 | 161.360474 | 155.819733 | 171.474594 | 167.673599 |
| 156.420868 | 182.460083 | 160.158096 | 170.235107 | 163.27623 |
| 152.676468 | 160.873566 | 173.394745 | 159.095261 | 159.543289 |
| 172.52478 | 174.609726 | 163.225021 | 174.83992 | 176.560318 |
| 170.142197 | 156.324707 | 156.834427 | 154.563217 | 150.865799 |
| 156.46785 | 143.65712 | 153.320236 | 148.456818 | 157.016235 |
| 148.817932 | 158.81427 | 157.347946 | 166.749023 | 168.632782 |
| 160.734451 | 163.271378 | 161.117172 | 166.887527 | 161.894592 |
| 154.771271 | 183.065567 | 185.197693 | 185.322113 | 177.744934 |
| 174.772232 | 177.19223 | 181.065338 | 178.893646 | 181.108444 |
| 190.587601 | 192.400208 | 194.327194 | 194.248077 | 195.640182 |
| 194.627914 | 187.62886 | 190.4302671 | 90.084 | 195.407013 |
| 184.007111 | 176.642242 | 182.562698 | 177.412598 | 163.297562 |
| 175.681183 | 166.36824 | 174.372467 | 165.019531 | 159.246063 |
| 154.089798 | 157.996918 | 151.793625 | 143.855682 | 142.898926 |
| 146.263214 | 155.886063 | 146.601929 | 142.712463 | 150.805313 |
| 147.396057 | 142.165771 | 142.260712 | 140.985153 | 136.907974 |
| 149.883057 | 135.702591 | 100.354614 | 102.918327 | 99.574036 |

Power-minimized bit allocation

| | | | | |
|---|---|---|---|---|
| 120.041176 | 102.794586 | 95.328941 | 96.011925 | 41.845097 |
| 127.769676 | 151.774384 | 166.294098 | 101.678429 | 167.111771 |
| 146.904709 | 157.308701 | 158.077408 | 161.163406 | 99.223534 |
| 115.100655 | 104.970589 | 156.685486 | 79.723534 | 101.303925 |
| 156.049179 | 157.800919 | 105.856865 | 160.350006 | 163.235535 |
| 161.827057 | 109.625885 | 159.630981 | 87.625885 | 108.728233 |
| 100.733727 | 119.020706 | 151.638718 | 151.416519 | 150.782516 |
| 152.567764 | 142.932205 | 150.866379 | 148.207108 | 154.337173 |
| 150.105927 | 158.87294 | 159.510529 | 160.385406 | 99.484627 |
| 160.61142 | 164.41011 | 162.444473 | 95.817963 | 162.054031 |
| 155.887482 | 182.82988 | 108.958824 | 108.545097 | 98.723534 |
| 174.26564 | 100.390198 | 90.211761 | 110.958824 | 107.545097 |
| 187.841568 | 188.639313 | 191.948318 | 191.03595 | 193.435211 |
| 192.072266 | 184.36348 | 187.081177 | 189.372528 | 192.482986 |
| 156.27066 | 162.933258 | 105.148003 | 101.346664 | 136.503113 |
| 164.49968 | 86.711998 | 98.910667 | 95.776001 | 158.558304 |
| 101.53624 | 103.03624 | 101.587769 | 94.805962 | 98.305962 |
| 136.59642 | 99.587769 | 95.246376 | 95.246376 | 122.152313 |
| 105.083687 | 113.063896 | 104.381256 | 110.02813 | 85.472572 |
| 113.508339 | 112.286118 | 105.619453 | 106.619453 | 106.620209 |

FIG. 24b: Peak Signal To Noise Ratio (PSNR) for 100 frames

Distortion-minimized bit allocation

| | | | | |
|---|---|---|---|---|
| 32.322498 | 32.501194 | 31.99641 | 31.444376 | 31.549109 |
| 31.235359 | 31.224928 | 31.392536 | 31.130945 | 31.082987 |
| 30.535301 | 30.623419 | 30.459816 | 30.24991 | 29.938574 |
| 30.20599 | 30.48436 | 30.35689 | 29.640718 | 29.760805 |
| 30.458597 | 30.494816 | 30.094488 | 30.139265 | 30.826382 |

APPENDIX-continued

| | | | | |
|---|---|---|---|---|
| 30.672396 | 30.366877 | 29.452442 | 29.494978 | 29.312765 |
| 29.804649 | 30.193666 | 30.288273 | 30.440762 | 30.547306 |
| 30.665632 | 30.823895 | 30.834284 | 30.924541 | 30.827398 |
| 30.903 | 30.889853 | 30.262161 | 30.10454 | 29.945143 |
| 29.691854 | 29.674223 | 30.021448 | 30.066031 | 30.026094 |
| 30.32147 | 31.029566 | 30.589905 | 30.491188 | 29.832798 |
| 30.490969 | 30.040779 | 30.331278 | 30.174158 | 29.790878 |
| 29.510172 | 31.536011 | 32.048958 | 32.759281 | 32.665855 |
| 32.386108 | 31.700802 | 32.524189 | 31.993883 | 32.542107 |
| 32.189812 | 29.50038 | 28.633879 | 27.476646 | 27.622562 |
| 28.301992 | 28.191521 | 27.031178 | 26.956877 | 27.061947 |
| 26.600945 | 26.358761 | 26.339312 | 26.263721 | 26.36833 |
| 26.453655 | 26.402941 | 26.524736 | 26.556416 | 26.538198 |
| 26.240713 | 26.299776 | 26.295441 | 26.355114 | 26.367025 |
| 26.369577 | 26.414268 | 26.337221 | 26.287823 | 26.323017 |

Fixed UEP scheme

| | | | | |
|---|---|---|---|---|
| 32.76445 | 32.523918 | 31.957508 | 31.69265 | 31.380962 |
| 30.878456 | 30.665537 | 30.840019 | 30.553745 | 30.525505 |
| 30.851795 | 30.845293 | 30.301865 | 30.009218 | 30.050762 |
| 25.647257 | 25.934521 | 25.666422 | 25.273829 | 25.461908 |
| 25.914541 | 25.953806 | 25.502752 | 26.070547 | 27.068813 |
| 27.100128 | 26.417849 | 25.634253 | 25.163382 | 25.005817 |
| 25.393442 | 26.119801 | 26.881056 | 27.15634 | 27.511539 |
| 27.512348 | 27.683977 | 27.693834 | 27.73941 | 27.698158 |
| 27.731428 | 27.650417 | 27.661751 | 27.517097 | 27.189459 |
| 27.375214 | 28.052849 | 28.24213 | 28.774414 | 29.264584 |
| 29.111176 | 29.439959 | 29.763861 | 29.08411 | 29.572641 |
| 29.27726 | 29.946745 | 29.773651 | 28.974758 | 28.532419 |
| 29.811853 | 30.389496 | 31.136351 | 31.29467 | 31.503204 |
| 30.88888 | 29.862869 | 30.943769 | 32.024578 | 31.192604 |
| 29.865419 | 28.86804 | 28.522495 | 27.402073 | 26.610247 |
| 27.42004 | 27.317692 | 26.429932 | 26.967823 | 27.132374 |
| 26.579254 | 26.404673 | 26.176584 | 26.121447 | 26.464489 |
| 26.466507 | 26.481096 | 26.572985 | 26.922665 | 26.87319 |
| 26.297012 | 26.42091 | 26.325377 | 26.482477 | 26.671587 |
| 26.787886 | 26.923321 | 26.726425 | 26.322226 | 26.399717 |

Power-minimized bit allocation

| | | | | |
|---|---|---|---|---|
| 31.402662 | 31.744953 | 31.904509 | 31.387861 | 30.037125 |
| 30.23288 | 29.616755 | 30.048956 | 29.496601 | 29.725777 |
| 30.339693 | 30.459587 | 30.335867 | 29.960716 | 29.580202 |
| 29.643839 | 29.598475 | 29.470827 | 28.896063 | 29.123291 |
| 30.197947 | 30.120117 | 29.462852 | 29.488787 | 30.491821 |
| 30.250776 | 29.383476 | 28.926773 | 28.532728 | 28.877432 |
| 29.05191 | 29.233852 | 29.204374 | 29.470682 | 30.1011 |
| 30.4655 | 30.467684 | 30.408428 | 30.341019 | 30.193151 |
| 30.75388 | 30.523832 | 29.985228 | 29.556038 | 28.497465 |
| 28.575802 | 29.805264 | 29.742201 | 29.105141 | 29.446571 |
| 30.3085 | 30.12188 | 28.950178 | 28.194868 | 28.723701 |
| 28.880905 | 29.253244 | 29.082638 | 28.547318 | 28.593328 |
| 30.388718 | 30.492994 | 30.500013 | 30.504562 | 30.51973 |
| 29.881721 | 30.863382 | 31.334511 | 32.259377 | 31.389193 |
| 29.092052 | 28.543377 | 27.858772 | 26.817146 | 26.651611 |
| 27.370649 | 27.100832 | 26.124441 | 26.292469 | 26.550947 |
| 26.205462 | 26.046564 | 26.018761 | 25.924183 | 26.015373 |
| 26.078547 | 26.002785 | 26.096176 | 26.137054 | 26.177452 |
| 26.090977 | 26.183649 | 26.169952 | 26.278873 | 26.215744 |
| 26.260914 | 26.300243 | 26.246401 | 26.175695 | 26.229383 |

FIG. 26a: ms for One Hundred (100) frames

Distortion-minimized bit allocation

| | | | | |
|---|---|---|---|---|
| 118.930351 | 104.626167 | 98.207764 | 99.653801 | 99.853882 |
| 129.881439 | 181.564941 | 179.866348 | 188.170425 | 182.40564 |
| 153.493851 | 166.78894 | 163.560181 | 174.819687 | 176.815994 |
| 166.450592 | 190.555527 | 166.068234 | 174.536942 | 167.165146 |
| 159.565491 | 171.199844 | 179.716003 | 169.075562 | 164.079117 |
| 176.759216 | 176.91153 | 167.240234 | 181.533463 | 177.269333 |
| 178.138596 | 163.787979 | 165.687759 | 162.280624 | 157.757172 |
| 163.82016 | 150.011978 | 162.786041 | 154.450348 | 165.510117 |
| 160.976242 | 173.970581 | 175.476242 | 185.780869 | 184.2742 |
| 175.389435 | 179.842346 | 181.093887 | 180.310349 | 180.227295 |
| 165.204971 | 183.866776 | 186.624908 | 187.661652 | 180.153183 |
| 180.642822 | 180.322357 | 181.625626 | 183.431213 | 182.114792 |
| 200.105026 | 200.174042 | 197.803421 | 200.365143 | 199.635239 |
| 201.132156 | 196.814011 | 195.624161 | 196.722198 | 198.029434 |
| 180.497879 | 182.843109 | 184.265457 | 185.415604 | 168.887527 |
| 180.0457 | 178.362137 | 179.874329 | 177.767059 | 166.90416 |

APPENDIX-continued

| | | | | |
|---|---|---|---|---|
| 157.540787 | 165.346558 | 157.366714 | 151.401886 | 142.640335 |
| 154.841888 | 158.547638 | 154.139297 | 142.713882 | 151.423523 |
| 152.111679 | 149.125885 | 148.611603 | 150.003052 | 141.547607 |
| 150.836227 | 137.550201 | 102.973412 | 105.74086 | 103.841415 |

Fixed UEP scheme

| | | | | |
|---|---|---|---|---|
| 120.038773 | 105.033936 | 99.10965 | 101.4851 | 100.26165 |
| 130.529434 | 181.848236 | 174.481644 | 187.012787 | 177.817413 |
| 151.570099 | 167.241333 | 161.105545 | 175.91687 | 173.573654 |
| 166.760544 | 187.414352 | 166.326828 | 170.901642 | 168.867264 |
| 159.327057 | 171.310898 | 179.515762 | 170.084778 | 164.464157 |
| 178.297806 | 178.388 | 168.766281 | 180.960052 | 179.358978 |
| 178.516235 | 163.2995 | 163.193359 | 163.544159 | 155.115784 |
| 164.345963 | 148.252213 | 163.800156 | 152.727997 | 166.061172 |
| 153.695007 | 170.552002 | 162.466019 | 184.948318 | 175.020477 |
| 170.43689 | 166.706726 | 172.968475 | 171.667999 | 175.353653 |
| 165.453705 | 187.259033 | 189.66449 | 189.60376 | 183.019531 |
| 180.216232 | 182.405884 | 184.201416 | 184.950348 | 185.432968 |
| 201.08667 | 199.012894 | 200.081543 | 201.63739 | 201.928421 |
| 202.632385 | 194.340363 | 194.248627 | 196.300308 | 200.692032 |
| 177.854935 | 182.121231 | 183.928986 | 182.920074 | 166.252472 |
| 177.748291 | 177.882645 | 177.083496 | 178.247086 | 161.408157 |
| 158.101013 | 165.239578 | 157.309784 | 151.235764 | 142.739868 |
| 150.758591 | 159.492599 | 149.65976 | 142.553406 | 148.173172 |
| 151.545563 | 148.880936 | 148.293015 | 149.171524 | 138.534195 |
| 149.723999 | 136.612076 | 102.853172 | 104.524864 | 100.348 |

Power-minimized bit allocation

| | | | | |
|---|---|---|---|---|
| 116.160286 | 101.367767 | 93.349174 | 98.509254 | 94.083061 |
| 127.265778 | 176.326828 | 173.531845 | 183.971161 | 175.295319 |
| 150.525024 | 165.546906 | 157.238907 | 172.560684 | 92.417885 |
| 165.219055 | 156.580338 | 164.53717 | 169.463501 | 165.123871 |
| 153.292892 | 170.545807 | 164.954193 | 166.065308 | 160.114044 |
| 174.264709 | 166.454193 | 163.20079 | 169.719788 | 173.021805 |
| 96.208313 | 159.986038 | 161.038956 | 161.131378 | 153.236755 |
| 162.937332 | 146.748856 | 161.281418 | 151.221649 | 164.089172 |
| 158.211520 | 172.385483 | 172.080658 | 178.280243 | 184.2742 |
| 175.389435 | 179.842346 | 180.593643 | 180.310349 | 179.894745 |
| 159.006744 | 180.183655 | 182.677811 | 182.20047 | 175.528946 |
| 174.163773 | 174.756241 | 177.868134 | 176.981644 | 178.95874 |
| 191.976868 | 189.500946 | 190.34021 | 195.204285 | 192.825989 |
| 193.121719 | 185.227036 | 187.408005 | 188.782532 | 192.075836 |
| 180.497879 | 182.843109 | 168.184311 | 185.415604 | 165.006012 |
| 176.878067 | 88.376472 | 101.543137 | 98.223534 | 162.607895 |
| 94.190353 | 95.690353 | 95.690353 | 149.37262 | 113.746826 |
| 148.79422 | 92.979057 | 149.748444 | 111.757751 | 147.531418 |
| 92.24157 | 145.872864 | 93.373726 | 145.897263 | 86.16497 |
| 149.361755 | 110.011765 | 102.973412 | 90.74157 | 103.841415 |

FIG. 26b: Peak Signal To Noise Ratio (PSNR) for 100 frames

Distortion-minimized bit allocation

| | | | | |
|---|---|---|---|---|
| 33.388496 | 33.669373 | 33.408531 | 32.799397 | 30.139427 |
| 33.941174 | 32.426456 | 32.854927 | 32.571697 | 32.68198 |
| 31.899536 | 31.846209 | 31.576071 | 31.464401 | 31.454554 |
| 31.535664 | 31.70369 | 31.374393 | 30.884878 | 30.991081 |
| 31.84322 | 31.880999 | 31.921902 | 32.077953 | 32.249691 |
| 32.09103 | 31.813311 | 31.417206 | 31.195223 | 30.951176 |
| 31.131912 | 31.452793 | 31.354382 | 31.431969 | 31.562994 |
| 31.665276 | 31.792545 | 31.696613 | 31.424019 | 31.365341 |
| 31.680153 | 31.693405 | 31.484962 | 30.847776 | 30.457577 |
| 30.488951 | 30.908718 | 31.033331 | 31.145531 | 31.553469 |
| 32.505489 | 32.552998 | 32.18475 | 31.598314 | 31.842375 |
| 32.081184 | 32.522167 | 32.311394 | 31.894968 | 31.953745 |
| 33.654095 | 34.007706 | 34.440655 | 34.444752 | 34.279358 |
| 33.444977 | 34.090092 | 34.420246 | 33.759293 | 33.987419 |
| 30.601955 | 30.137341 | 29.726669 | 28.573614 | 28.805723 |
| 29.522821 | 29.12192 | 27.954824 | 28.424179 | 28.454006 |
| 27.151115 | 26.970095 | 26.884071 | 26.772938 | 26.701632 |
| 26.747147 | 26.967503 | 27.014086 | 27.096952 | 27.067467 |
| 26.783464 | 26.673557 | 26.700537 | 26.783239 | 26.819414 |
| 26.880978 | 27.034023 | 26.982676 | 26.824421 | 26.851055 |

Fixed UEP scheme

| | | | | |
|---|---|---|---|---|
| 33.231937 | 33.488609 | 33.362411 | 32.512974 | 32.163654 |
| 32.023617 | 32.087288 | 32.531898 | 32.47287 | 32.210781 |
| 31.624842 | 31.777941 | 31.66457 | 31.619427 | 31.418858 |
| 31.532249 | 31.323067 | 31.165733 | 29.488684 | 29.525833 |
| 30.336714 | 30.488791 | 30.274345 | 30.044127 | 30.114759 |
| 30.231447 | 29.897984 | 29.887321 | 30.118811 | 30.159058 |
| 30.248556 | 30.748699 | 30.836027 | 30.867603 | 31.170177 |
| 31.291073 | 31.164534 | 31.121346 | 31.401297 | 31.351158 |
| 31.284279 | 30.554182 | 30.42947 | 30.28661 | 30.278994 |
| 30.39658 | 30.966383 | 26.127291 | 26.686211 | 26.647455 |
| 26.366659 | 26.548807 | 26.381777 | 25.973215 | 26.587601 |
| 26.546673 | 27.152704 | 28.123289 | 28.970297 | 29.18428 |
| 31.053225 | 31.258579 | 31.379217 | 33.151478 | 32.845463 |
| 31.498503 | 32.903831 | 33.682457 | 34.605389 | 34.718292 |
| 31.408617 | 30.842836 | 29.973616 | 28.693377 | 28.798429 |
| 29.586842 | 28.943041 | 27.799698 | 27.962872 | 28.090429 |
| 27.15345 | 26.890577 | 26.687992 | 26.646816 | 27.005733 |
| 26.94017 | 26.464012 | 26.577242 | 26.91848 | 26.941383 |
| 26.77429 | 26.840322 | 26.819462 | 26.896212 | 26.830059 |
| 26.898109 | 26.900316 | 26.883863 | 26.54423 | 26.574162 |

Power-minimized scheme

| | | | | |
|---|---|---|---|---|
| 33.582207 | 33.95343 | 33.232883 | 32.875256 | 32.298672 |
| 32.473114 | 32.254253 | 32.707806 | 31.50325 | 31.899975 |
| 31.873747 | 31.893358 | 30.078756 | 30.448971 | 29.60833 |
| 30.178741 | 29.794933 | 29.627445 | 30.451933 | 30.43856 |
| 30.41687 | 30.952185 | 30.072472 | 30.350559 | 30.793671 |
| 30.826012 | 29.850634 | 29.57519 | 29.290724 | 29.533686 |
| 29.212015 | 29.505108 | 30.989365 | 31.225384 | 31.565819 |
| 31.722179 | 31.2829 | 31.325502 | 31.559874 | 31.55839 |
| 31.574083 | 31.457434 | 31.301744 | 30.686214 | 30.497229 |
| 30.399715 | 31.018776 | 30.884525 | 31.075693 | 31.408024 |
| 30.759403 | 31.505575 | 32.10014 | 30.843391 | 30.652742 |
| 30.634027 | 31.440193 | 30.907139 | 30.470402 | 30.617229 |
| 32.180904 | 32.516144 | 32.885113 | 33.992313 | 32.792919 |
| 30.870892 | 31.965769 | 33.401531 | 34.485405 | 32.724659 |
| 30.964081 | 30.146334 | 28.01515 | 27.555481 | 28.50741 |
| 29.380953 | 27.173027 | 26.124149 | 26.292469 | 26.817856 |
| 26.33288 | 26.125313 | 26.018761 | 26.012234 | 26.08577 |
| 26.106392 | 26.002115 | 26.279865 | 26.233225 | 26.393005 |
| 26.11652 | 26.258884 | 26.204458 | 26.372618 | 26.246414 |
| 26.349415 | 26.342976 | 26.434429 | 26.199263 | 26.303782 |

What is claimed is:

1. A method comprising:

measuring the error rate at a Physical Layer in a protocol stack for an application in communication over a third generation (3G) wireless network between a server and a wireless client;

estimating throughput, as a function of the measured error rate, in the 3G network between the server and the wireless client;

reporting the measured error rate and the estimated throughput to an Application Layer in the protocol stack;

receiving a request for service from the wireless client at the server; and transmitting the requested service, at the estimated throughput, from the server to the wireless client through the 3G wireless network.

2. The method as defined in claim 1, wherein transmitting the requested service comprises:

allocating the requested service between a plurality of called base layers (BLs) and a plurality of called enhancement layers (ELs); and if data of one called BL or of one called EL is sent from the server but not received at the wireless client or is received at the wireless client and is in error;

then performing an error correction procedure, wherein the error correction procedure that is performed for the data of the one called BL is different than the error correction procedure that is performed for the data of the one called EL.

3. The method as defined in claim 2, wherein:

the error correction procedure that is performed for the data of the one called BL includes:

an automatic retransmission request (ARQ) from the wireless client to the server; and
a forward error correction (FEC) transmission from the server to the wireless client;
the error correction procedure that is performed for the data of the one called EL includes:
a forward error correction (FEC) transmission from the server to the wireless client.

4. The method as defined in claim 2, wherein the error correction procedure that is performed for the data of the one called BL comprises:
when the wireless client determines that a delay bound for the data of the one called BL is unexpired and that a retransmission request limit for the data of the one called BL is unexceeded, then the wireless client sends a retransmission request to the server identifying a lost or an error portion of the data of the one called BL, and upon receipt of the retransmission request in the server from the wireless client, the server sends to the wireless client a forward error correction (FEC) transmission including the lost one called BL or the error portion of the data of one called BL that is less that all of the data in the one called BL.

5. The method as defined in claim 4, wherein the retransmission request limit for the data of the one called BL ($N_{max}$) is a function of:
the delay bound ($D_{constrained}$) for the data of the one called BL, which is limited by a video frame rate for video data of the data of the one called BL;
the current roundtrip transmission time (RTT) for transmissions between the wireless client and the server; and
an estimate of the time consumed to process the data of the one called BL ($D_{processing}$).

6. The method as defined in claim 5, wherein $$N_{max} = \frac{D_{constrained} - D_{processing}}{RTT}.$$

7. A computer-readable medium having computer-executable instructions that, when executed by a computer, performs the method as recited in claim 1.

8. A computer comprising one or more computer-readable media having computer-executable instructions that, when executed by the computer, perform the method as recited in claim 1.

9. A method comprising:
measuring performance information at a Physical Layer in a protocol stack that includes a Data Link Layer, a Transport Layer, and an Application Layer, the protocol stack providing a communication protocol between a server and a wireless client in a 3G wireless network, the performance information including:
the physical-channel bit error rate (BER);
the transport-channel block error rate (BLER); and
the transport-channel bit rate;
estimating from the measured performance information:
a UDP throughput between the Transport Layer and the RLC sublayer of the Data Link Layer; and
the average transport-channel block error rate $P_{BL}$;
reporting to the Application Layer, after a user-defined time interval, the measured performance information, the UDP throughput, and the average transport-channel block error rate $P_{BL}$;
receiving at the server a request for service from the wireless client; and
transmitting from the server to the wireless client the requested service at the estimated UDP throughput based upon the average transport-channel block error rate $P_{BL}$.

10. The method as defined in claim 9, wherein transmitting from the server to the wireless client the requested service comprises:
allocating the requested service in a plurality of called BL packets for a plurality of base layers (BLs) and in a plurality of called EL packets for a plurality of enhancement layers (ELs); and
performing an error correction procedure when one called BL packet or one called EL packet is unreceived at the wireless client or is received at the wireless client and is in error, wherein the error correction procedure that is performed for one called BL packet is different than the error correction procedure that is performed for one called EL packet.

11. The method as defined in claim 10, wherein:
the error correction procedure that is performed for the one called BL packet includes:
an automatic retransmission request (ARQ) from the wireless client to the server; and
a forward error correction (FEC) transmission from the server to the wireless client;
the error correction procedure that is performed for one called EL packet includes:
a forward error correction (FEC) transmission from the server to the wireless client.

12. The method as defined in claim 10, wherein the error correction procedure that is performed for the one called BL packet comprises:
if the wireless client determines that a delay bound for the one called BL packet is unexpired and that a retransmission request limit for the one called BL packet is unexceeded;
then the wireless client sends a retransmission request to the server identifying a lost or an error portion of the one called BL packet; and
upon receipt of the retransmission request by the server from the wireless client, then the server sends to the wireless client a forward error correction (FEC) transmission including the lost packet or the error portion of the one called BL packet that is less that all of the one called BL packet.

13. The method as defined in claim 12, wherein the retransmission request limit ($N_{max}$) for the one called BL packet is a function of:
the delay bound ($D_{constrained}$) for the one called BL packet, wherein $D_{constrained}$ is limited by a video frame rate for video data of the one called BL packet;
the current roundtrip transmission time (RTT) for one packet between the wireless client and the server; and
an estimate of the time consumed to process the one called BL ($D_{processing}$).

14. The method as defined in claim 13, wherein $$N_{max} = \frac{D_{constrained} - D_{processing}}{RTT}.$$

15. A computer-readable medium having computer-executable instructions that, when executed by a computer, performs the method as recited in claim 9.

16. A computer comprising one or more computer-readable media having computer-executable instructions that, when executed by the computer, perform the method as recited in claim 9.

17. A method comprising:
receiving at a server a request for service over a 3 G wireless network from a wireless client;
allocating the requested service in a plurality of called BL packets for a plurality of base layers (BLs) and in a plurality of called EL packets for a plurality of enhancement layers (ELs);
transmitting from the server to the wireless client the requested service in the plurality of BL and EL packets;
performing an error correction procedure when one called BL packet or one called EL packet is unreceived at the wireless client or is received at the wireless client and is in error, wherein:
the error correction procedure that is performed for the one called BL packet includes:
an automatic retransmission request (ARQ) from the wireless client to the server; and
a forward error correction (FEC) transmission from the server to the wireless client;
the error correction procedure that is performed for one called EL packet includes:
a forward error correction (FEC) transmission from the wireless server to the wireless client.

18. The method as defined in claim 17, wherein the error correction procedure that is performed for the one called BL packet comprises:
if the wireless client determines that a delay bound for the one called BL packet is unexpired and that a retransmission request limit for the one called BL packet is unexceeded;
then the wireless client sends a retransmission request to the server identifying a lost or an error portion of the one called BL packet; and
upon receipt of the retransmission request by the server from the wireless client, then the server sends to the wireless client a forward error correction (FEC) transmission including the lost packet or the error portion of the one called BL packet that is less that all of the one called BL packet.

19. The method as defined in claim 18, wherein the retransmission request limit ($N_{max}$) for the one called BL packet is a function of:
the delay bound ($D_{constrained}$) for the one called BL packet, wherein $D_{constrained}$ is limited by a video frame rate for video data of the one called BL packet; and
the current roundtrip transmission time (RTT) for one packet between the wireless client and the server; and
an estimate of the time consumed to process the one called BL ($D_{processing}$).

20. The method as defined in claim 19, wherein $$N_{max} = \frac{D_{constrained} - D_{processing}}{RTT}.$$

21. A computer-readable medium having computer-executable instructions that, when executed by a computer, performs the method as recited in claim 17.

22. A computer comprising one or more computer-readable media having computer-executable instructions that, when executed by the computer, perform the method as recited in claim 17.

23. A network server comprising:
a system memory to store a content delivery media streaming application;
a device to communicate with a 3G wireless network;
a control logic, in communication with the system memory and the device, to:
invoke an instance of the content delivery media streaming application, in response to a request for service from a wireless client through the 3G wireless network;
estimate throughput in the 3G network with the wireless client;
measure an error rate at a Physical Layer in a protocol stack that includes an Application Layer;
report the measured error rate and the estimated throughput to the Application Layer; and
provide the requested media content to the wireless client through the 3G wireless network at the estimated throughput.

24. The network server defined in claim 23, wherein:
the content delivery media streaming application provides the requested media content to the wireless client by an allocation of the requested media content between both called base layers (BLs) and called enhancement layers (ELs); and
if:
data of one called BL is sent from the network server but not received at the wireless client or is received at the wireless client and is in error;
a delay bound for the data of the one called BL is unexpired; and
a retransmission request limit for the data of the one called BL is unexceeded;
then the request for media content from the wireless client is a retransmission request identifying a lost or an error portion of the data of the one called BL, and upon receipt of the retransmission request by the server from the wireless client, the server sends to the wireless client a forward error correction (FEC) transmission including the lost one called BL or the error portion of the data of one called BL that is less that all of the data in the one called BL.

25. The network server as defined in claim 24, wherein the retransmission request limit for the data of the one called BL ($N_{max}$) is a function of:
the delay bound ($D_{constrained}$) for the data of the one called BL, which is limited by a video frame rate for video data of the data of the one called BL;
the current roundtrip transmission time (RTT) for transmissions between the wireless client and the server; and
an estimate of the time consumed to process the data of the one called BL ($D_{processing}$).

26. The network server as defined in claim 25, wherein $$N_{max} = \frac{D_{constrained} - D_{processing}}{RTT}.$$

27. A method comprising:
deriving at a server from a prior communication with a wireless client from a communication link in a 3G wireless network:
a Bit Error Rate (BER);
a Forward Error Correction (FEC); and
a channel delay metric;
estimating a channel status between the wireless client and the server as a function of the BER, the FEC, and the channel delay metric;

receiving at the server a request for service from the wireless client;

allocating, at a bit rate derived from the estimated channel status, bits for the requested service between a plurality of base layers (BLs) and a plurality of enhancement layers (ELs), depending upon the media type designated in the request for service from the wireless client; and adjusting the quality of service level in supplying the service requested by the client as a function of the allocation of the bits for the requested service.

28. The method as defined in claim 27, wherein:

the server and the wireless client communicate through a transport protocol that includes a Physical Layer, a Data Link Layer, a Network Layer, a Transport Layer, and an Application Layer;

the bits of the requested service are allocated at the Application Layer; and adjusting the quality of service level further comprises:

adaptively spreading the requested service, as a function of various data rates for different media in the requested service, among a plurality of transport channels in an air interface with the Physical Layer;

adaptively selecting, as a function of a selected latency and fault tolerance for different media in the requested service, a transport channel coding model for each said transport channel in the Physical Layer;

adaptively selecting, as a function of a selected latency and fault tolerance for different media in the requested service, an interleaving length in the Physical Layer;

adaptively scheduling packets, as a function of a selected latency and fault tolerance for different media in the requested service, for each said BL and each said EL between multiple media streams in the Medium Access Control (MAC) sublayer of the Data Link Layer;

adaptively determining, as a function of the selected latency for different media in the requested service, a retransmission-count in the Radio Link Control (RLC) sublayer of the Data Link Layer; and adaptively selecting a transport protocol in the Transport Layer for different media streams as a function of different media in the requested service from the wireless client.

29. The method as defined in claim 28, wherein adaptively selecting the transport protocol comprises:

selecting the TCP protocol for the delivery of Web data and file data requested in the requested service from the wireless client; and selecting the UDP protocol for the delivery of other data requested in the requested service from the client.

30. The method as defined in claim 28, wherein allocating bits for the requested service comprises:

adaptively allocating, as a function of the estimated channel status, bits for the requested service for a source bit stream and for Forward Error Correction (FEC) coding in the Application Layer.

31. A computer-readable medium having computer-executable instructions that, when executed by a computer, performs the method as recited in claim 27.

32. A computer comprising one or more computer-readable media having computer-executable instructions that, when executed by the computer, perform the method as recited in claim 27.

* * * * *

UNITED STATES PATENT AND TRADEMARK OFFICE
CERTIFICATE OF CORRECTION

PATENT NO. : 6,999,432 B2
APPLICATION NO. : 09/895870
DATED : February 14, 2006
INVENTOR(S) : Qian Zhang et al.

It is certified that error appears in the above-identified patent and that said Letters Patent is hereby corrected as shown below:

On the Title Page, Item (54), in "Title", line 2, after "MULTIMEDIA" insert -- DELIVERY --.

In column 1, line 2, after "MULTIMEDIA" insert -- DELIVERY --.

In column 2, line 22, delete "Quality-of-Service" and insert -- Quality of Service --, therefor.

In column 3, line 42, delete "22a–22b" and insert -- 22a–22f --, therefor.

In column 3, line 47, delete "20a–20" and insert -- 20a–20b --, therefor.

In column 3, line 49, delete "24a and 24b" and insert -- 24a–24c --, therefor.

In column 6, line 26, after "one-" insert -- way --.

In column 7, line 3, after "all" insert -- configuration operations --.

In column 10, line 61, delete "$X_i$" and insert -- $X_1$ --, therefor.

In column 11, line 59, delete "$R_i=F(D_i)$" and insert -- $R_1=F(D_1)$ --, therefor.

In column 14, line 49, delete "NR" and insert -- $N_R$ --, therefor.

In column 15, line(s) 1-5, delete

" $AUB = B_{trans} \times \frac{1-P_{u,ff}}{2-P_{u,ss}-P_{u,ff}} = B_{trans} \times \frac{1-P_{u,fs}}{1+P_{u,fs}-P_{u-ss}}$ " and insert -- $AUB = B_{trans} \times \frac{1-P_{u,ff}}{2-P_{u,ss}-P_{u,ff}} = B_{trans} \times \frac{1-P_{u,fs}}{1+P_{u,fs}-P_{u,ss}}$ --, therefor.

UNITED STATES PATENT AND TRADEMARK OFFICE
CERTIFICATE OF CORRECTION

PATENT NO. : 6,999,432 B2
APPLICATION NO. : 09/895870
DATED : February 14, 2006
INVENTOR(S) : Qian Zhang et al.

It is certified that error appears in the above-identified patent and that said Letters Patent is hereby corrected as shown below:

In column 23, line(s) 1-5, delete

" $P_{fail,packet,layer}(i,j) \left[ \prod_{m=1}^{i-1} (1 - P_{fail,packet,layer}(m,j)) \right]$ " and insert -- $P_{fail,layer}(i,j) = P_{fail,packet,layer}(i,j) [ \prod_{m=1}^{i-1} (1 - P_{fail,packet,layer}(m,j))]$ --, therefor.

In column 23, line 13, delete "bn$_1$" and insert -- $bn_1$ --, therefor.

In column 24, line(s) 52-59, delete

" $PC_{ARQ}(R_{ARQ}) = \sum_{i=1}^{bn} pc(R_{s\_base}(i), t_1) + \sum_{j=2}^{N_{max}-1} \{ \sum_{i=1}^{bn} [P_{fail}(i,j-1) \times pc(R_{s\_base}(i), t_j)] \}$ " and insert -- $PC_{ARQ}(R_{ARQ}) = \sum_{i=1}^{bn} pc(R_{s\_base}(i), t_1) + \sum_{j=2}^{N_{max}-1} \{ \sum_{i=1}^{bn} [P_{fail}(i,j-1) \times pc(R_{s\_base}(i), t_j)] \}$ --, therefor.

UNITED STATES PATENT AND TRADEMARK OFFICE
CERTIFICATE OF CORRECTION

PATENT NO. : 6,999,432 B2
APPLICATION NO. : 09/895870
DATED : February 14, 2006
INVENTOR(S) : Qian Zhang et al.

It is certified that error appears in the above-identified patent and that said Letters Patent is hereby corrected as shown below:

In column 27, line 20, after "TABLE 2" insert -- b --.

In column 27, line 65, after "23a–23c" insert -- ) --.

In column 28, line 4, delete "comparison" and insert -- comparisons --, therefor.

In column 30, line 35, after "technologies" insert -- . --.

In column 34, line 3, after "general-" insert -- purpose --.

Signed and Sealed this

Eleventh Day of August, 2009

David J. Kappos
*Director of the United States Patent and Trademark Office*